US010232599B2

(12) United States Patent
Cucchi et al.

(10) Patent No.: US 10,232,599 B2
(45) Date of Patent: Mar. 19, 2019

(54) AUTOMATED DOOR ASSEMBLY AND METHODS, PRESS USED THEREWITH, AND ADHESIVE THEREFOR

(71) Applicant: Masonite Corporation, Tampa, FL (US)

(72) Inventors: George Cucchi, Odessa, FL (US); Bei-Hong Liang, Naperville, IL (US); Michael MacDonald, Batavia, IL (US)

(73) Assignee: Masonite Corporation, Tampa, FL (US)

( * ) Notice: Subject to any disclaimer, the term of this patent is extended or adjusted under 35 U.S.C. 154(b) by 0 days.

(21) Appl. No.: 15/445,040

(22) Filed: Feb. 28, 2017

(65) Prior Publication Data

US 2017/0232635 A1 Aug. 17, 2017
US 2019/0047171 A9 Feb. 14, 2019

Related U.S. Application Data

(62) Division of application No. 14/215,693, filed on Mar. 17, 2014, now Pat. No. 9,579,818.
(Continued)

(51) Int. Cl.
*B32B 37/18* (2006.01)
*B27D 3/02* (2006.01)
(Continued)

(52) U.S. Cl.
CPC ............... *B32B 37/18* (2013.01); *B27D 3/02* (2013.01); *B27D 5/003* (2013.01); *B27M 3/18* (2013.01);
(Continued)

(58) Field of Classification Search
CPC . B27M 3/18; B30B 7/023; B27D 3/02; E06B 3/7001; E06B 3/70; E06B 3/822; B32B 37/1284; B32B 37/18; B32B 39/00
See application file for complete search history.

(56) References Cited

U.S. PATENT DOCUMENTS 535,673 A 3/1895 Clayton
1,870,517 A 8/1932 Lacey
(Continued)

FOREIGN PATENT DOCUMENTS

CN 201061892 Y 5/2008
DE 2733765 A1 2/1979
(Continued)

OTHER PUBLICATIONS

Dexheimer et al, "Hot-Melt Adhesives", Adhesives in Manufacturing, p. 325, 1983.
(Continued)

*Primary Examiner* — John L Goff, II
(74) *Attorney, Agent, or Firm* — Berenato & White, LLC

(57) ABSTRACT

A door pressing system for pressing interior passage doors, exterior entry doors, bi-fold doors, and/or closet doors features a multi-door pressing station including first and second presses, a loading device, and a discharging device. The pressing station is configured to alternatively move the first and second presses into operative alignment with the loading and discharging devices. The press in operative alignment delivers a pressed assembled door to the discharging device and receives an assembled door layup to be pressed from the loading device. The other press that is out of operatively alignment presses an assembled door received therein. Additional methods and systems are also provided.

17 Claims, 18 Drawing Sheets

Related U.S. Application Data

(60) Provisional application No. 61/793,524, filed on Mar. 15, 2013.

(51) Int. Cl.
*B27M 3/18* (2006.01)
*B30B 7/02* (2006.01)
*B27D 5/00* (2006.01)
*E06B 3/72* (2006.01)
*E06B 3/82* (2006.01)
*E06B 3/70* (2006.01)

(52) U.S. Cl.
CPC ............... *B30B 7/023* (2013.01); *E06B 3/72* (2013.01); *E06B 3/7017* (2013.01); *E06B 3/822* (2013.01)

(56) References Cited

U.S. PATENT DOCUMENTS

| | | | |
|---|---|---|---|
| 2,565,779 A | 8/1951 | Muddiman | |
| 2,735,461 A | 2/1956 | Pater | |
| 2,889,586 A | 6/1959 | Akerberg | |
| 2,993,244 A | 7/1961 | James | |
| 3,132,981 A | 5/1964 | Stack | |
| 3,225,505 A | 12/1965 | Lytz | |
| 3,367,823 A | 2/1968 | Clausen et al. | |
| 3,389,652 A | 6/1968 | Bruder et al. | |
| 3,616,090 A | 10/1971 | Larson | |
| 3,643,487 A | 2/1972 | Wiig | |
| 3,671,615 A | 6/1972 | Price | |
| 3,765,993 A | 10/1973 | Raffensparger et al. | |
| 3,824,058 A | 7/1974 | Axer et al. | |
| 3,873,395 A | 3/1975 | Ehrlich | |
| 3,927,705 A * | 12/1975 | Cromeens ............... B27F 1/16 |
| | | | 144/248.2 |
| 3,963,552 A | 6/1976 | Troutner et al. | |
| 4,039,369 A | 8/1977 | Versteege | |
| 4,318,264 A | 3/1982 | Rewitzer | |
| 4,342,615 A | 8/1982 | Kock, II | |
| 4,486,264 A | 12/1984 | McKernan | |
| 4,517,148 A | 5/1985 | Churchland | |
| 4,643,787 A | 2/1987 | Goodman | |
| 4,842,669 A | 6/1989 | Considine | |
| 5,020,966 A | 6/1991 | Kiker | |
| 5,096,750 A | 3/1992 | Edlert et al. | |
| 5,142,835 A | 9/1992 | Mrocca | |
| 5,155,959 A | 10/1992 | Richards et al. | |
| 5,167,105 A | 12/1992 | Isban et al. | |
| 5,177,868 A | 1/1993 | Kyle et al. | |
| 5,415,943 A | 5/1995 | Groger et al. | |
| 5,560,168 A | 10/1996 | Gagne et al. | |
| 5,588,996 A | 12/1996 | Costello | |
| 5,665,197 A | 9/1997 | Fujii et al. | |
| 5,752,594 A | 5/1998 | Fournier | |
| 5,776,292 A | 7/1998 | Fujii et al. | |
| 5,848,705 A | 12/1998 | Gianpaolo et al. | |
| 5,875,609 A | 3/1999 | Quinif | |
| 5,875,710 A | 3/1999 | Honda et al. | |
| 5,992,127 A | 11/1999 | Quinif | |
| 6,067,699 A | 5/2000 | Jackson | |
| 6,085,813 A | 7/2000 | Elliott et al. | |
| 6,125,901 A | 10/2000 | Englisch et al. | |
| 6,132,836 A | 10/2000 | Quinif | |
| 6,170,224 B1 | 1/2001 | Boyse et al. | |
| 6,389,769 B1 | 5/2002 | McKinney et al. | |
| 6,615,711 B2 | 9/2003 | Matsuzuki et al. | |
| 6,811,647 B1 | 11/2004 | Graf et al. | |
| 7,314,534 B2 | 1/2008 | Hardwick | |
| 7,501,037 B2 | 3/2009 | Stroup et al. | |
| 7,819,163 B2 | 10/2010 | Tyler | |
| 8,123,895 B2 | 2/2012 | Tyler | |
| 8,171,700 B2 | 5/2012 | Barnes | |
| 9,579,818 B2 | 2/2017 | Cucchi | |
| 2001/0030103 A1 | 10/2001 | Runonen | |
| 2002/0100996 A1 | 8/2002 | Moyes et al. | |
| 2003/0173734 A1 | 9/2003 | Wong et al. | |
| 2004/0096535 A1 | 5/2004 | Hudecek et al. | |
| 2005/0028921 A1 | 2/2005 | Stroup et al. | |
| 2005/0102940 A1 | 5/2005 | Tyler | |
| 2007/0295054 A1 | 12/2007 | Karlsson | |
| 2009/0071609 A1 | 3/2009 | Stroup et al. | |
| 2009/0211688 A1 | 8/2009 | Perttila et al. | |
| 2009/0272489 A1 | 11/2009 | Clark et al. | |
| 2012/0027999 A1 | 2/2012 | Liang et al. | |

FOREIGN PATENT DOCUMENTS

| | | |
|---|---|---|
| DE | 3032914 A1 | 4/1982 |
| DE | 4428768 A1 | 2/1996 |
| DE | 19916041 A1 | 10/2000 |
| DE | 10224793 | 7/2003 |
| DE | 10342012 A1 | 4/2004 |
| EP | 0860253 A2 | 8/1998 |
| EP | 1260329 A2 | 11/2002 |
| EP | 2025481 A2 | 2/2009 |
| EP | 2258916 A1 | 12/2010 |
| EP | 2415571 A2 | 2/2012 |
| GB | 1413320 A | 11/1975 |
| GB | 2293853 A | 4/1996 |
| IE | 74236 B | 7/1997 |
| JP | 59118618 A | 7/1984 |
| JP | 2001032436 A | 2/2001 |
| JP | 2004009681 A | 1/2004 |
| JP | 2005104052 A | 4/2005 |
| WO | WO2005087464 A1 | 9/2005 |

OTHER PUBLICATIONS

Machine Translation of European Patent Application Publication No. EP-2025481A2, published Feb. 2009, 6 pages.
International Search Report, International Application No. PCT/US2014/030297, dated Jun. 12, 2014.
Machine translation of German Patent Publication No. DE-3032914A1, originally published Apr. 1982, 11 pages.
Machine translation of DE2733765 date unknown.

* cited by examiner

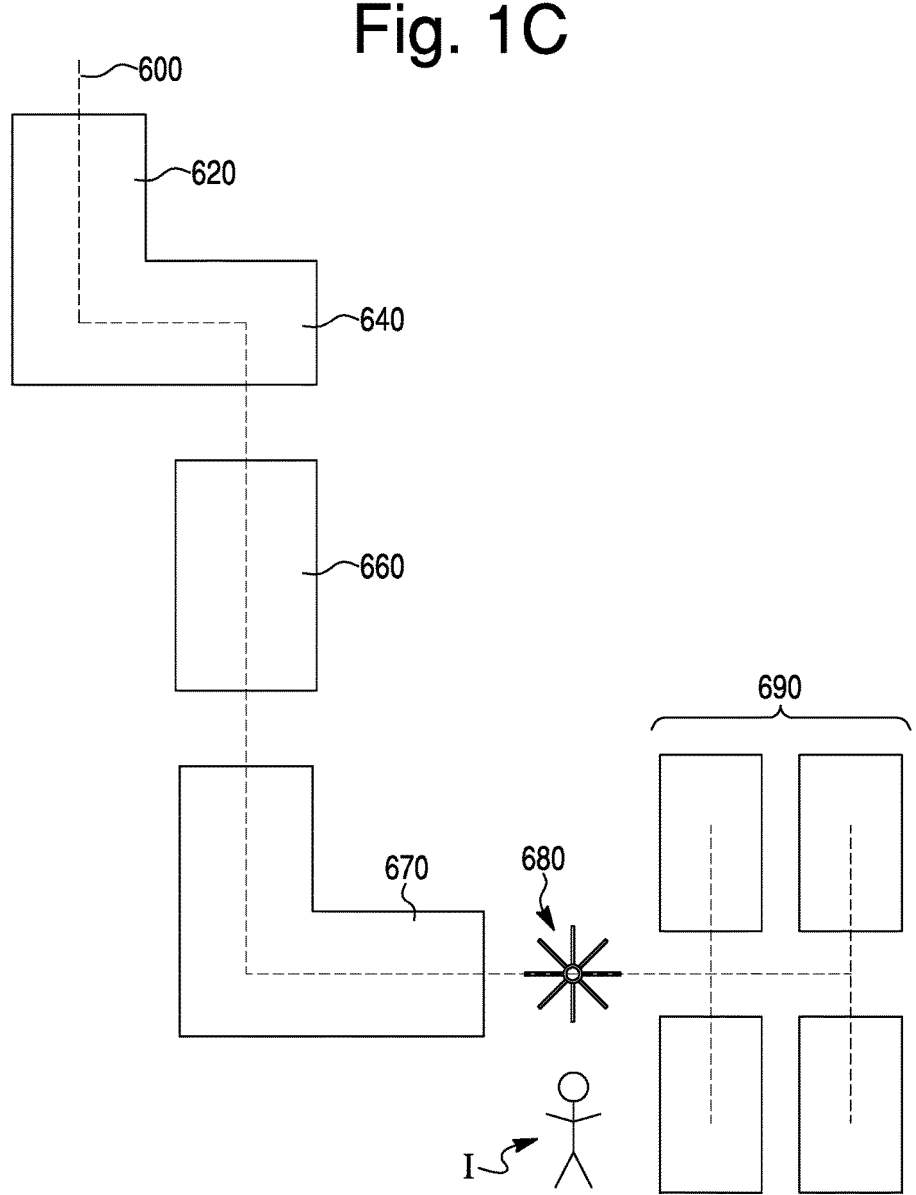

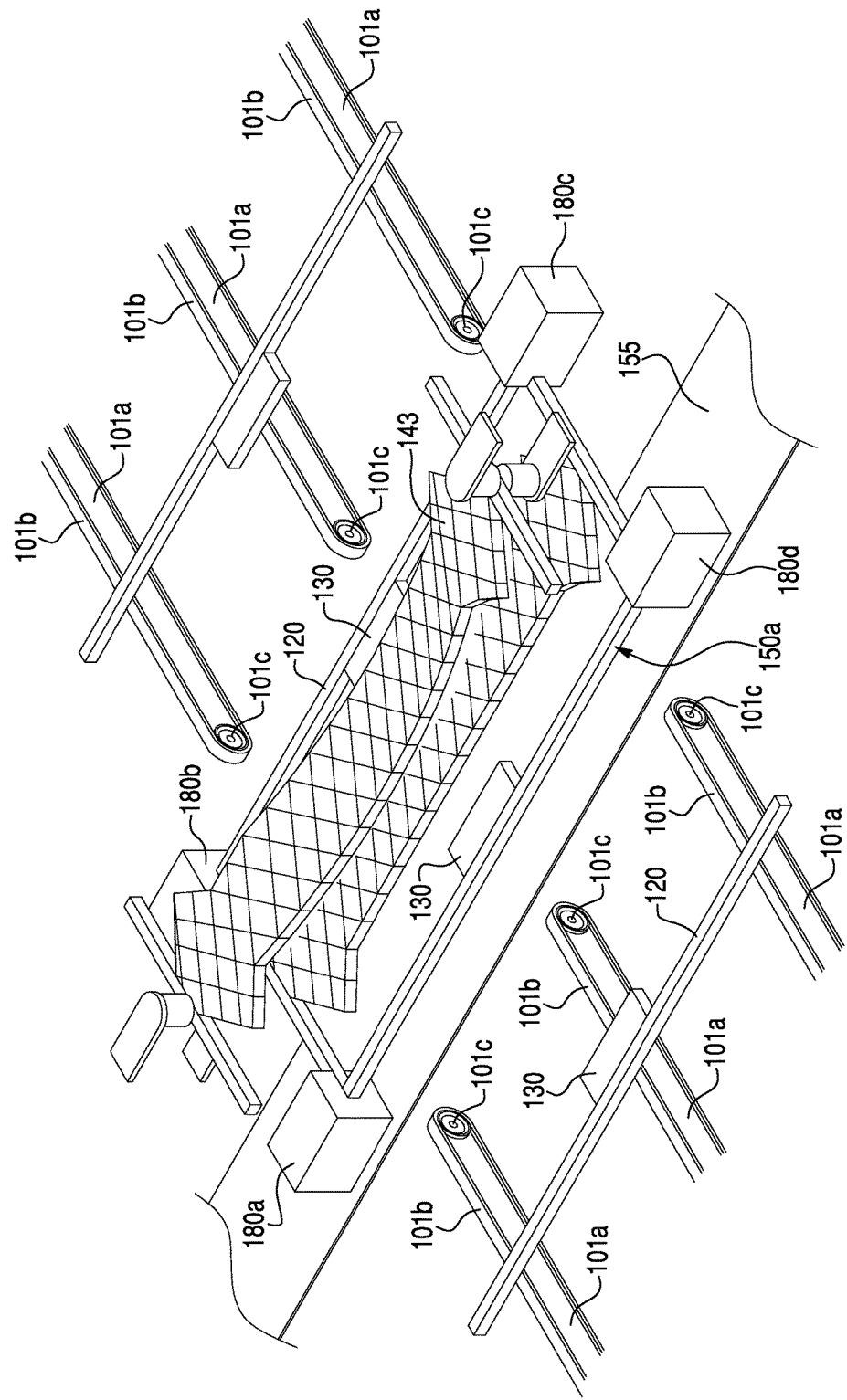

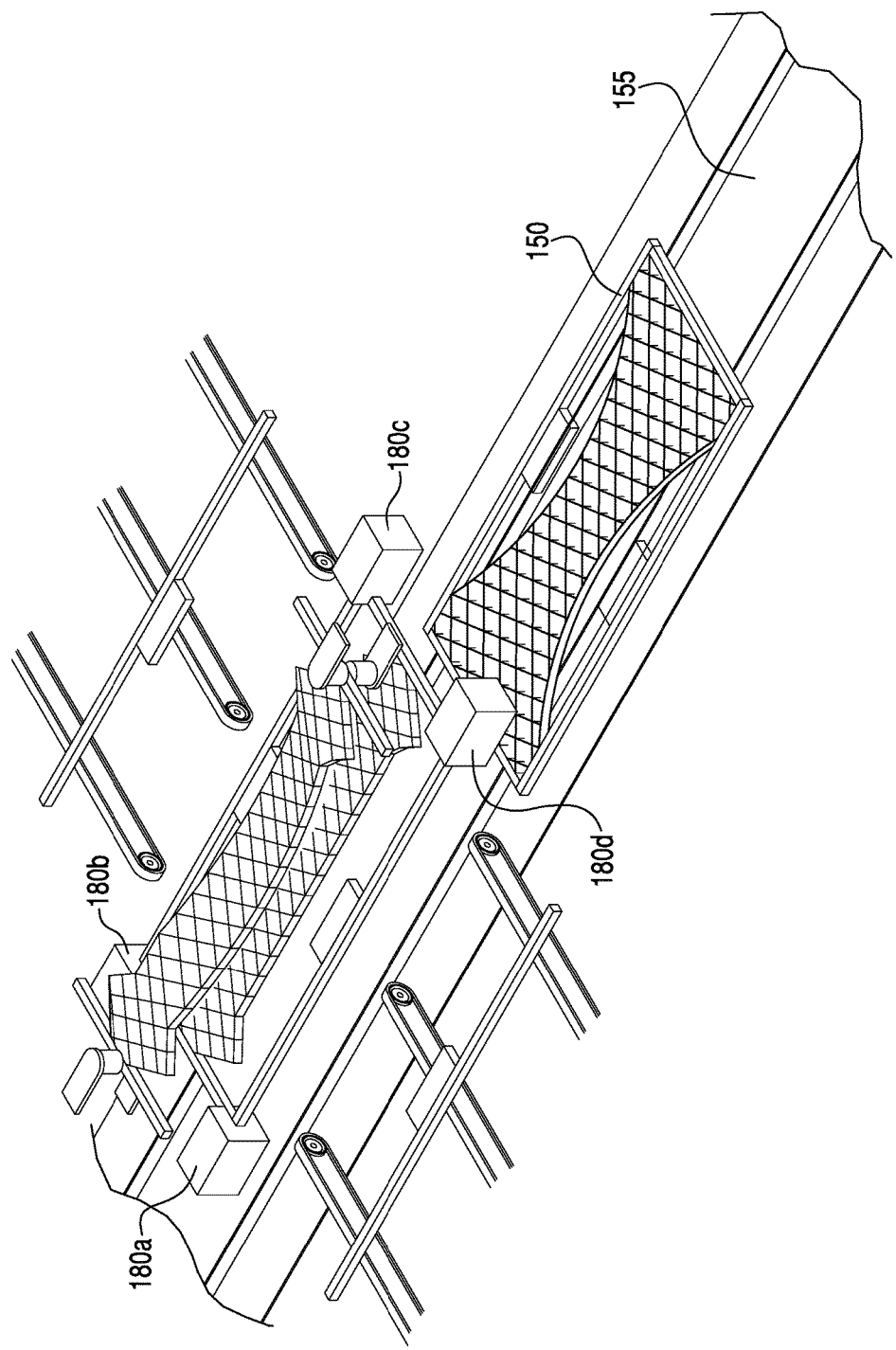

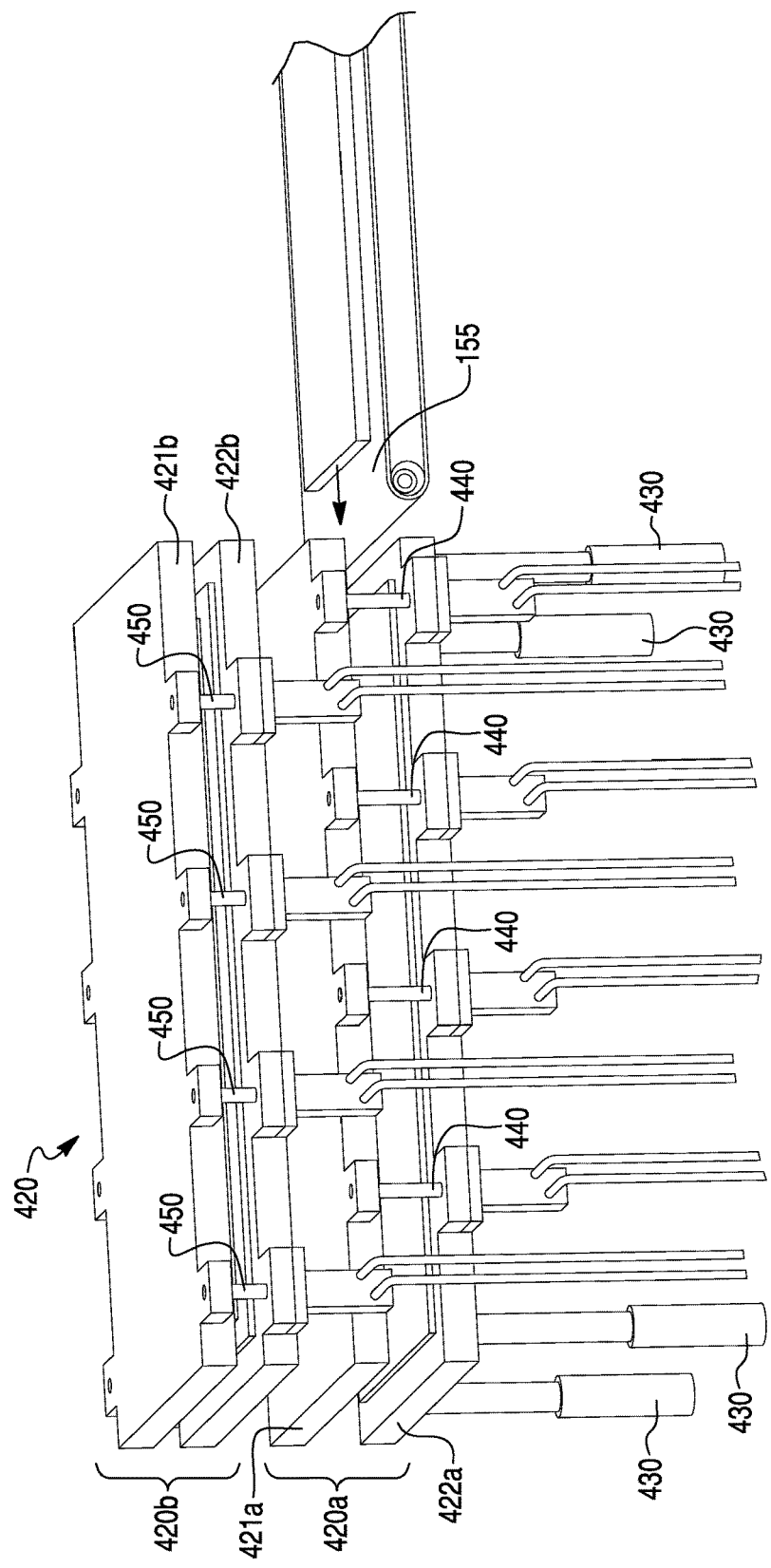

AUTOMATED DOOR ASSEMBLY AND METHODS, PRESS USED THEREWITH, AND ADHESIVE THEREFOR

CROSS-REFERENCE TO RELATED APPLICATIONS AND CLAIM TO PRIORITY

This application is a divisional of U.S. application Ser. No. 14/215,693, filed Mar. 17, 2014, now U.S. Pat. No. 9,579,818, which claims the benefit of priority to U.S. provisional application No. 61/793,524 filed Mar. 15, 2013, the complete disclosures of which are incorporated herein by reference.

FIELD OF THE INVENTION

The present invention is directed to systems and methods, particularly automated systems and methods, for manufacturing doors having first and second door facings and internal door frames, multi-door pressing stations for use therewith, and adhesives and doors processed and manufactured in the course of using the systems and practicing the methods.

BACKGROUND

A door such as a hollow core door typically includes two molded or flush door skins (sometimes called "door facings") attached to opposite sides of an interior door frame, which is typically made of wood but sometimes metal or composites. The door facings are often molded from a composite of wood fiber and resin compound, although fiberglass-reinforced polymeric door facings and steel door facings are also known. The door frame typically includes stiles and rails positioned around the perimeter of the door that together form the frame. The interior of the door may optionally include a core.

Manual assembly of doors is relatively labor intensive, expensive, and subject to quality variations. During manual assembly, a door facing is placed on a production table with its intended exterior surface face down. Adhesive is applied, typically via a roll coater, to the opposite sides of the stiles and rails. The core and/or lock block(s), if any, are likewise coated. The adhesively coated frame parts (stiles and rails) are then placed by hand on the door facing on the table. Typically, the rails are placed at the top and bottom of the door facing, and the stiles are placed on opposite sides of the door facing. With the adhesive applied to a second upward-facing side of the stiles and rails, a second door facing is placed with its interior surface on the second side of the frame. Another door facing is then placed with its exterior surface face down on the previously assembled door and the process repeated until a stack of doors has been assembled. In this manual assembly process, the assembled doors should be handled carefully, given that the components of the door are in a loose "layup" state and can easily shift during transportation.

In the above-described manner, each successive door assembly is stacked on top of the previous door assembly until a predetermined quantity of door assemblies has been stacked. The stack of door assemblies is then transported to and loaded in a press. The press applies pressure to the entire stack for a period of time sufficient to allow the adhesive to bond the door facings to their respective frames. Conventional adhesives, such as polyvinyl acetate, may take approximately thirty minutes or more to cure or harden in the press before the door reaches "green" strength. The door achieves "green" strength when the adhesive has reached sufficient bonding strength to hold the door components together for further handling.

Once green strength is achieved, the doors may be removed from the press and moved to an in-process inventory until the adhesive reaches adequate cure strength. Depending upon the adhesive used and ambient conditions, the doors may need to remain in inventory for a relatively long period of time, for example two hours or more, or even as long as twenty-four hours, before the adhesive reaches adequate bonding strength for final processing.

After reaching adequate cure strength the doors are then moved to a final processing station. Final processing includes edge trimming the doors to customer specification and optional coating and/or painting of door skins and exposed edges of the stiles and rails around each door perimeter. Using this process, manufacturing time for a door may be twenty-four hours or more, from the time production is initiated to the resulting finished door is complete and ready for delivery to a customer or user.

SUMMARY

According to an embodiment of the invention described in greater detail below, a door pressing system is provided for pressing doors, such as interior passage doors, exterior entry doors, bi-fold doors, and/or closet doors. In accordance with this embodiment, the system includes a multi-door pressing station featuring a first press including a first set of platens, and a second press including a second set of platens, each set of platens respectively having at least one platen movable relative to the other platen of the set of platens between an open state and a closed state. The system further includes a loading material handling and movement device configured to deliver assembled doors in a layup state to the multi-door pressing station, and a discharging material handling and movement device configured to receive assembled doors that have been pressed by the multi-door pressing station. The multi-door pressing station is configured to alternatingly move the first and second presses between a loading/unloading position and a pressing position. In the loading/unloading position, one (e.g., the first) of the first and second presses is in the open state and operative alignment with the loading and discharging material handling and movement devices to receive at least a first of the assembled doors in the layup state delivered by the loading material handling and movement device and to discharge at least a second of the assembled doors that has been pressed to the discharging material handling and movement device. In the pressing position, the other (e.g., the second) of the first and second presses is in the closed state for pressing a third of the assembled doors and is out of operative alignment with the loading and discharging material handling and movement devices. In one variation of this embodiment, the multi-door pressing station is movable vertically between the loading/unloading position and the pressing position. In another variation of this embodiment, the first and second presses move alternatingly between the loading/unloading position and the pressing position.

In accordance with another embodiment, a system for making any of passage doors, interior passage doors, exterior entry doors, bi-fold doors and/or closet doors includes at least one framing station, at least one adhesive coating station, at least one assembly station, and at least one pressing station. The framing station is configured to receive framing components such as rails and stiles, and optionally lock blocks and/or cores, from delivery component lines, especially automated delivery component lines, to assemble door frames. The assembled door frames are sent to an adhesive coating station which applies adhesive to the door frames. The assembly station optionally orients the door skins and joins first and second door skins to opposite surfaces of the frames to form assembled doors. The pressing station includes a first press and a second press for alternatingly pressing the assembled doors and receiving/discharging the assembled doors prior to/after pressing. After the assembled doors are discharged from the pressing station, the pressed assembled doors may be received by a non-linear accumulator.

In accordance with a further embodiment, a system is provided for making door frames for at least one of interior passage doors, exterior entry doors, passage doors, closet doors, and/or bi-fold doors. The system includes a core attachment station for connecting an expandable core to a top rail and a bottom rail, and a robotic system, including a pair of grippers, for respectively gripping top and bottom rails. The grippers draw the top and bottom rails apart to expand the attached expandable core, and the robotic system delivers the spaced apart top and bottom rails and the expanded core to a framing station where the top and bottom rails are attached to a pair of stiles to form a door frame. The framing station may include a jig system for supporting and holding the rails and stiles at the four corners of the door frame where the rails and stiles abut during the attachment process. The stiles and rails may be attached via quick-setting adhesive, a mechanical fastener or a combination thereof to allow the frame to be self-supporting.

In accordance with a further embodiment, a system is provided for making door frames for at least one of interior passage doors, exterior entry doors, passage doors, closet doors, and/or bi-fold doors. The system includes a framing station including a jig system for supporting and holding the rails and stiles in the arrangement of a door frame. One or more lock blocks may be secured to the door frame components, typically a stile, prior to the attachment process at the jig station. Adhesive is applied and/or mechanical fasteners are employed to join the rails, stiles, and another other frame components so as to allow the frame to be self-supporting. In accordance with this embodiment, a lock block selected from a set of lock blocks may be adhered to a respective stile prior to being delivered to the framing station. Likewise, an expandable core selected from a set of expandable cores may have its opposite ends adhered to respective pairs of rails prior to being delivered to the framing station.

In accordance with a variation of the above and other embodiments, the jig system includes four clamping members, one at each of the four corners where the rails and stiles abut.

According to another variation of the above and other embodiments, each of the clamping members further includes at least one adhesive nozzle for applying adhesive to associated edges of the stiles and/or rails where the rails and stiles abut.

In accordance with a further embodiment, a door pressing system for making doors, in particular at least one of interior passage doors, exterior entry doors, bi-fold doors, and/or closet doors is provided. The system includes a multi-door pressing station, which in turn includes at least a first press and a second press, each having a pair/set of movable platens, for receiving assembled doors. The pressing station is adapted so that one of the presses performs a pressing operation on at least one assembled door layup while the other press receives and/or discharges a pressed second assembled door. A loading system is provided for successively delivering door layups to the pressing station, and a discharging system is downstream of the pressing station for carrying off pressed assembled doors. The pressing station is operable to selectively and alternatingly move the first and second presses between a first (loading/unloading) position wherein one of the presses is oriented to receive at least a first assembled door layup from the loading system and discharge at least a pressed second assembled door to the discharge system, and a second (pressing) position in which the other of the presses is oriented to press at least a third assembled door.

In accordance with a variation of the above and other embodiments disclosed herein, presses of the multi-door pressing station are movable in tandem with one another between the first and second positions. Movement may be accomplished using suitable hydraulic equipment, for example. The movement may be vertical movement between upper and lower positions with correspond to the first and second pressing positions, or vice versa.

In accordance with a further embodiment, a door assembly system is provided for pressing and curing a plurality of assembled doors including door skins adhered to a frame assembly. The door assembly station features a multi-door pressing station including at least first and second presses, each press having a pair of movable platens, for moving the platens between and open state for receiving door assemblies and a closed state for pressing door assemblies. The pressing station applies pressure to each assembled door in the first press to perform a pressing operation on the assembled door(s) in the first press while receiving and/or discharging one or more assembled doors into/from the second press. A non-linear accumulator is downstream of the pressing station for holding at least first and second pressed assembled doors during an adhesive curing process.

In accordance with a further embodiment, the multi-door pressing station delivers pressed assembled doors to an accumulator in the form of a star conveyor that rotates a plurality of pressed assembled doors through a circular path. The accumulator holds the pressed assembled doors during a curing process.

In accordance with still a further embodiment, a system is provided for making door frames for at least one of interior passage doors, exterior entry doors, passage doors, bi-fold doors, and/or closet doors. The system includes a core attachment station for attaching an expandable core to a top rail and a bottom rail with a first adhesive. A lock block attachment station connects at least one lock block to a stile with a second adhesive, which may be the same as or different than the first adhesive. A robotic system delivers the top and bottom rails and the adhesively attached core to a framing station where the top and bottom rails are adhesively attached to a pair of stiles to form a door frame.

Still another embodiment disclosed herein features a method of assembling a door, which features: successively delivering assembled doors in a layup state via a loading material handling and movement device to a multi-door pressing station including first and second presses; discharging at least a first of the assembled doors having been pressed from the first press of the multi-door pressing station to a discharging material handling and movement device, and loading at least a second of the assembled doors in the layup state into the first press of the multi-door pressing station while the first press is in operative alignment with the loading and discharging material handling and movement devices, and simultaneously pressing at least a third of the assembled doors in the second press of the multi-door pressing station; moving the second press into operative alignment with the loading and discharging material handling and movement devices; and discharging the at least third of the assembled doors having been pressed from the second press and loading at least a fourth of the assembled doors in the layup state into the second press while the second press is in operative alignment with the loading and discharging material handling and movement devices, and simultaneously pressing the at least second of the assembled doors in the first press. The embodiment may further include applying adhesive to door frame components and frame the door frame components and applied adhesive into door frames; and securing first and second door skins on opposite surfaces of the door frames to provide the assembled doors in the layup state.

Still another embodiment of the present invention features an assembled door or pre-assembled door, which may include one or more of the following features: a door frame with abutting ends and edges of the stiles and rails adhesively attached to one another; an expandable or expanded core adhesively and/or mechanically attached to rails; lock blocks adhered and/or fastened to a stile prior to the stile being laid-up as a door frame or door assembly, and other structures described herein.

Other embodiments, including apparatus, systems, stations, methods, doors, door skins, and the like which constitute part of the invention, will become more apparent upon reading the following detailed description of the exemplary embodiments and viewing the drawings. It is to be understood that both the foregoing general description and the following detailed description are exemplary and explanatory only and therefore not restrictive.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings:

FIGS. 1A, 1B, and 1C are partial schematic views collectively illustrating an exemplary automated door production line, wherein FIG. 1C illustrates finishing components downstream of the pressing station;

FIG. 2E is an enlarged partial view of the frame assembly station of FIG. 2, depicting the frame assembly jig from an angle different than the angle shown in FIGS. 2C and 2D wherein an assembled frame is shown with another rail/core assembly being suspended above the already assembled frame;

FIG. 2F is an enlarged partial view of the frame assembly station of FIG. 2, depicting the frame assembly jig assembling a frame while an already assembled frame is transported by conveyor from the jig toward the adhesive coating station;

FIGS. 6F and 6G are schematic illustrations depicting the two presses in their respective loading positions;

DETAILED DESCRIPTION OF EXEMPLARY EMBODIMENT(S) AND EXEMPLARY METHOD(S)

Figure 1A:
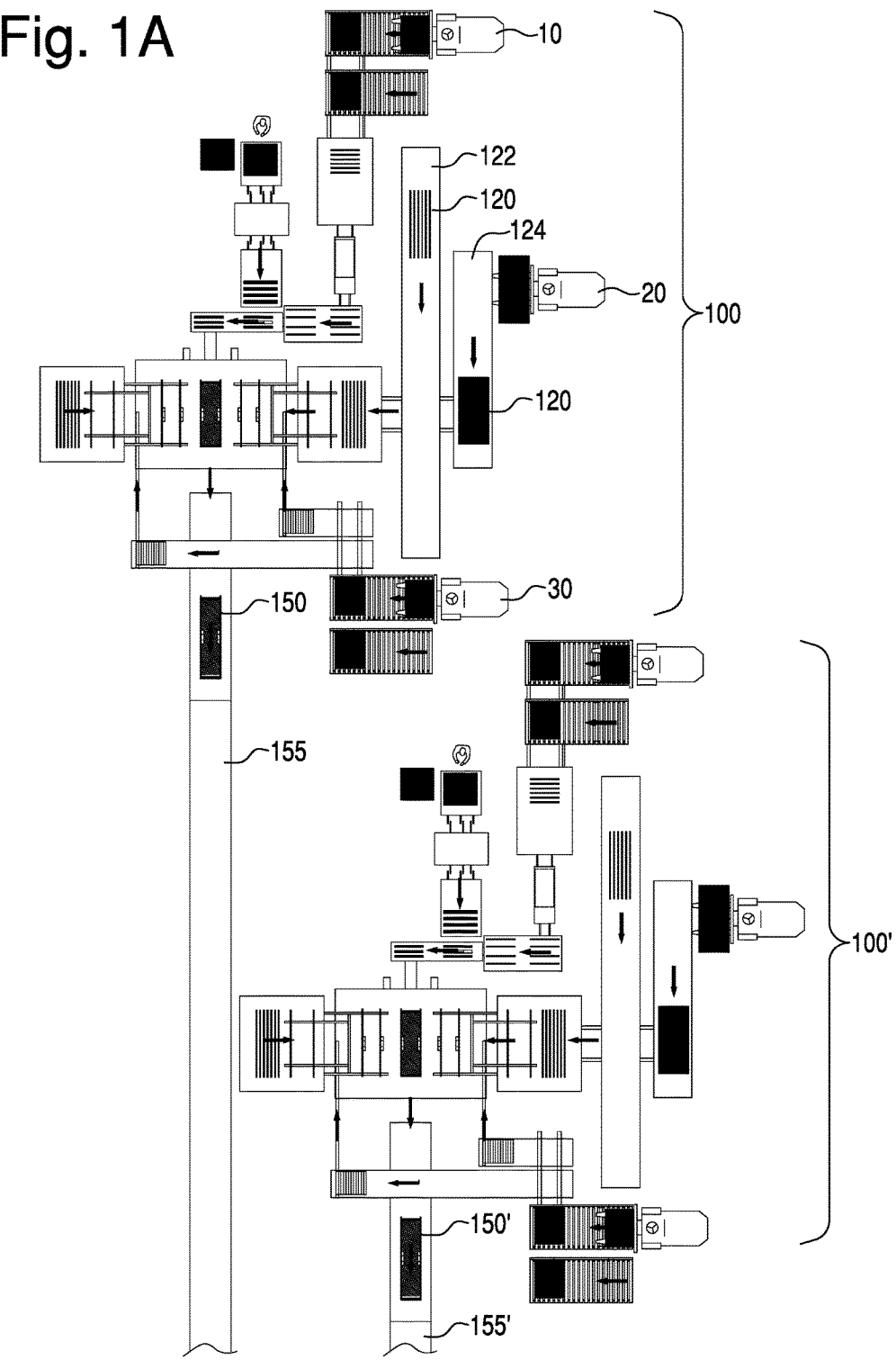

Reference will now be made in detail to exemplary embodiments and methods as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

Figure 1B:
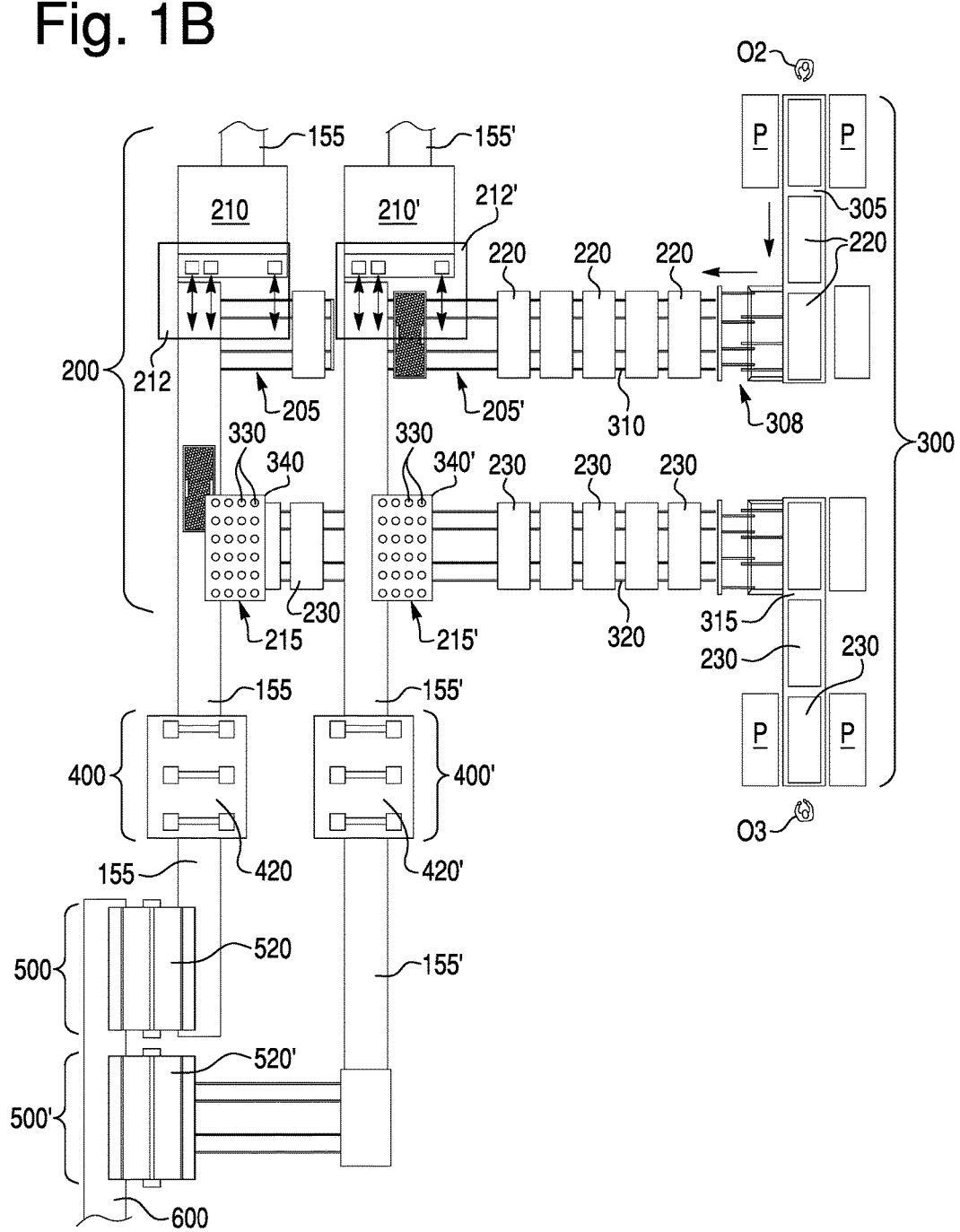

FIGS. 1A-1C collectively depict an automated door production line according to an embodiment of the present invention.

In an exemplary embodiment, the door production line is a synchronous system designed to operate at a specific rate of door build, for example one door produced per unit of time. In order to avoid bottlenecks and maximize throughput, each step in the process, including transportation, occurs at a preset rate intended to assure that the door build rate is achieved and optionally optimized. Therefore, it is important to provide suitable press time and proper adhesives and adhesive application to sufficiently bond the components of the door together. Improper bonding can lead to quality issues, or failure of the frame which would thus necessitate suspension of line operation.

The production line may be divided for purposes of discussion into five (5) different sections or stages of the production process. First, referring to FIGS. 1A and 2, at least one frame assembly station 100 is provided whereby rails 110, stiles 120, lock blocks 130 and cores 140 are delivered to a central framing jig 101. At the central framing jig 101, the frame components are assembled into a door frame 150. In FIG. 1A, a second frame assembly station 100' is also shown. Thereafter, as best shown in FIG. 1B, at least one adhesive coating and layup station 200 receives assembled frames 150 and the assembled frames 150 are coated with adhesive at coater 210, after which door skins 220, 230 are applied to the assembled door frame 150. The door skins 220, 230 are delivered from a door skin delivery station 300. As further shown in FIG. 1B, the assembled doors or door layups are then passed to a pressing station 400 and thereafter to an accumulator station 500. The assembled and pressed doors are thereafter passed to a single conveyor 600 where the doors are delivered to finishing stations where the assemble doors may be trimmed, painted, inspected, and stacked.

Figure 2:
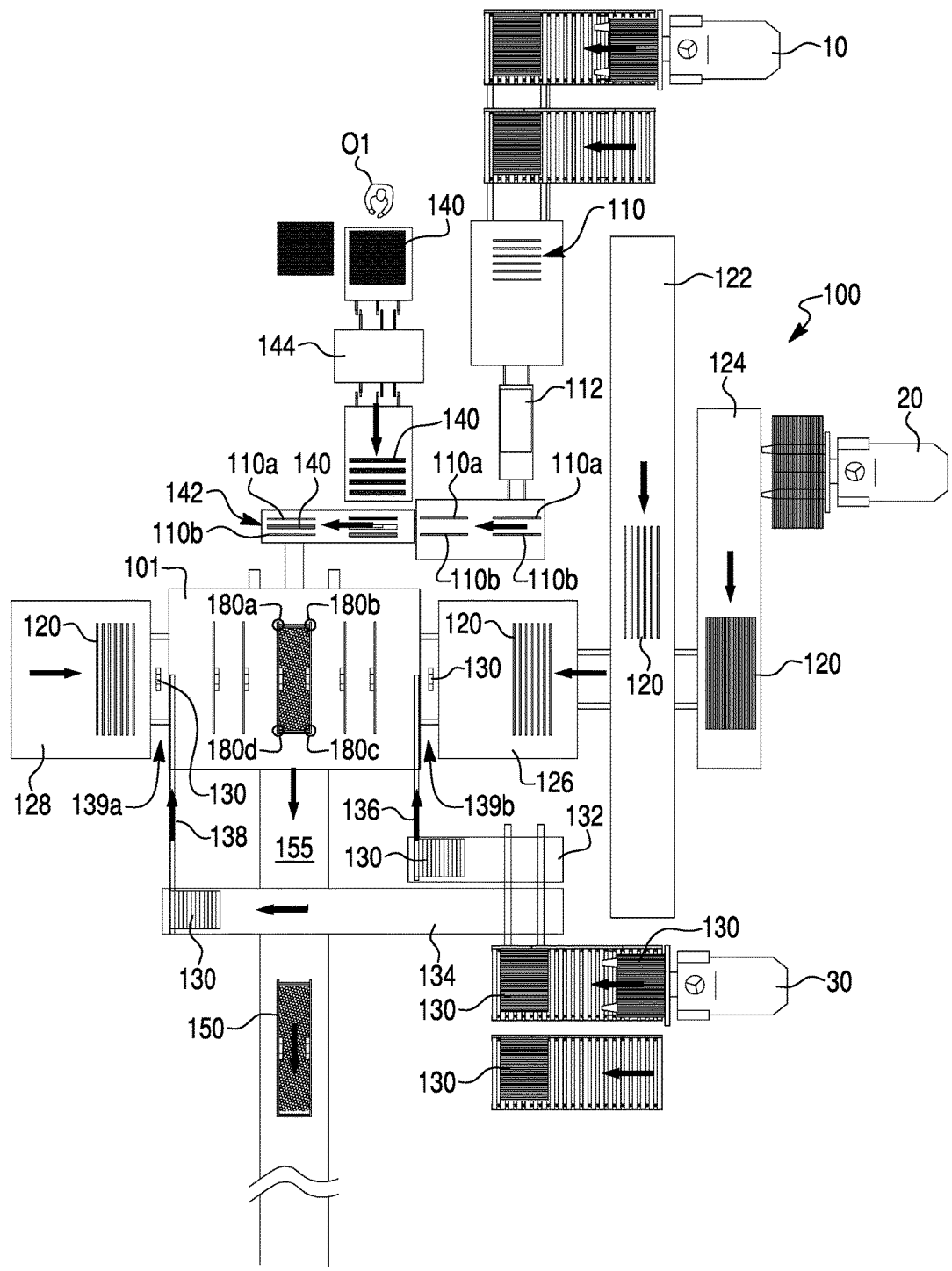
FIG. 2 is a schematic view of a frame assembly station of the door production line according to the present invention.
Figure 2A:
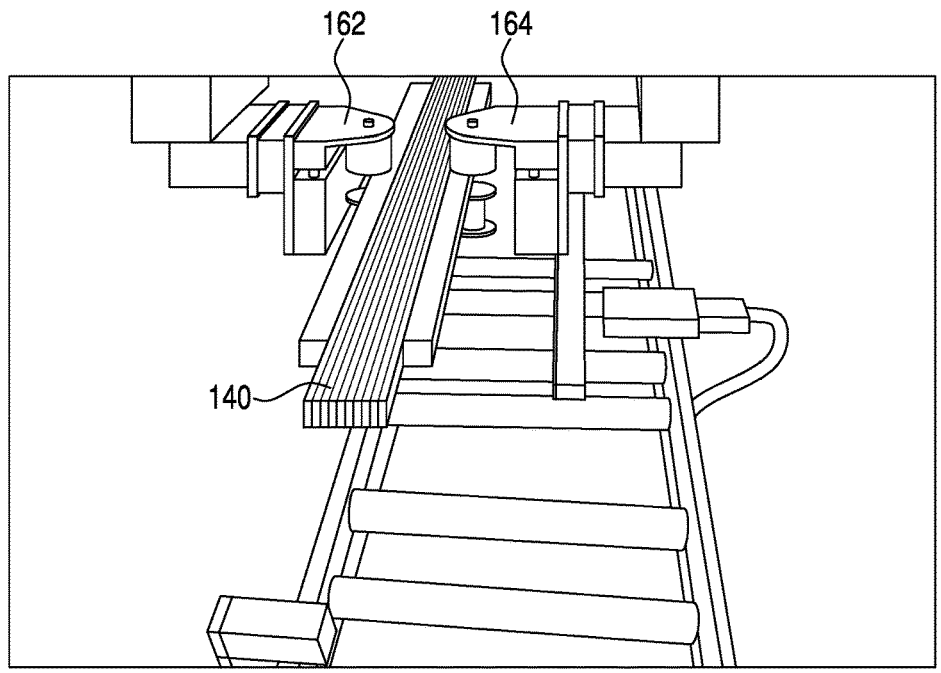
FIG. 2A is an enlarged partial view of the frame assembly station of FIG. 2, depicting the rails and core after being assembled at the core attachment station where the core is adhered to a pair of rails.

With reference to FIGS. 1A and 2, the frame assembly station 100 receives rails 110, stiles 120, lock blocks 130, and cores 140, which are delivered to the central framing jig 101 by material handling devices, which preferably are moving conveyors, such as conveyors having continuous moving belts for delivery of the frame components. The rails 110, stiles 120, lock blocks 130, and cores 140 preferably are delivered in sets of predetermined numbers and arranged in a form that facilitates maintenance of the door build rate. Various material handling and movement devices and methods may be used to transport components of each door assembly, and are simply designated by the arrows in the individual stations and between stations. Material handling and movement devices may include, for example, conveyors, gantries, manipulators, grippers, automated guided vehicles, pick and place systems and automated storage/retrieval systems. The components and stations of the production line may be operated by an operator's control, automatically by utilizing various sensors including optical, magnetic, and radio sensors, or any combination of manual and automatic operation. Though specific examples of material handling and movement are provided in the exemplary description of certain stations, these may be modified as would be understood by one of ordinary skill in the art upon viewing this disclosure.

Core attachment station 142, best shown in FIG. 2, includes an automated rail delivery system whereby rails 110 are introduced by an automated rail picking and placing device, such as a mechanical arm, which removes the rails 110 from the delivery device, such as fork truck 10. The automated rail picking and placing device places a predetermined number of rails 110 onto a moving conveyor belt that delivers the rails 110 to a rail indexing device 112 that selects a pair of rails 110a, 110b from the rail delivery system. In an exemplary embodiment the rail delivery system includes a top rail conveyor and a bottom rail conveyor, although a single rail conveyor or more than two rail conveyors may be used as discussed in connection with the first and second stile conveyors. As also shown in FIG. 2, a single top rail 110a may be selected from the top rail conveyor and a single bottom rail 110b is selected from the bottom rail conveyor. In various exemplary embodiments, a door having more than one top rail 110a, such as a double top rail (not shown), more than one bottom rail 110b, such as a double bottom rail (not shown), or both a double bottom rail and double top rail, and/or one or more intermediate rails (not shown) may be desired. Therefore, the rail indexing device 112 is capable of variably selecting a single rail 110a, 110b or multiple rails from the top rail conveyors, the bottom rail conveyors, and optionally intermediate rail conveyors (not shown). If more than a single top and/or bottom rail 110a, 110b is selected, the two or more top rails 110a are attached, for example, by fasteners or an adhesive such as a hot melt adhesive to form a multi (e.g. double) top rail. Two or more bottom rails 110b may be processed in similar manner to form a multi (e.g., double) bottom rail.

After being selected, the rails 110a, 110b are moved to a core attachment station 142. At the core attachment station 142, a core 140 is connected to the top rail 110a and to the bottom rail 110b, for example, by a hot melt adhesive. Additionally or as an alternative, fasteners may be used to establish or strength the connection. The core 140 is preferably placed onto a material delivery mechanism by an operator O1 and then is brought to the core attachment station 142 by a conveyor or indexing device 144. The core 140 may be an expandable core, such as made from expandable cardboard, honeycomb, or any suitable substance depending on the door that is to be assembled. In an exemplary embodiment, the core 140 is an expandable corrugated cardboard core or honeycomb paper core. The production line is set up and operated so that the core 140 is variable and optionally different cores 140 may be selectively attached to the rails or omitted from the assembled frame. Optionally, the core may be formed in situ.

A thermoplastic hot melt adhesive attaches the core to the rails 110a, 110b. The thermoplastic hot melt adhesive may be preheated and applied in a liquid, softened, or molten state. For example, the liquid adhesive may be extruded from nozzles under pressure. The adhesive bonds nearly instantaneously so that the rails may be moved apart in order to allow the core to be expanded quickly after contacting the rails and adhering the core and rails to one another. The bond strength is sufficient to allow the core to remain attached to the rails as the rails are moved apart from one another and also to remain attached and fixed as the rails are assembled into a frame and the assembled frame is connected to door skins.

As best shown in FIG. 2, a stile assembly station includes an automated stile delivery system through which stiles 120 are introduced by an automated stile picking and placing device, such as a mechanical arm, which removes the stiles 120 from the delivery device, which is illustrated as a fork truck 20. The automatic stile picking and placing device places a predetermined number of stiles 120 onto two conveyor belts 122, 124 that deliver the stiles 120 to respective stile indexing devices 126, 128. Stile indexing devices 126, 128 deliver one set of stiles 120 to the left side of the frame assembly jig 101 and another set of stiles 120 to the right side of the frame assembly jig 101. In the preferred embodiment, the stiles 120 delivered from the conveyor 122 are passed to the stile indexing device 126 for delivery to the right side of the frame assembly jig 101, and the stiles 120 delivered from the conveyor 124 pass below the frame assembly jig 101 to the stile indexing device 128 on the left side of the frame assembly jig 101.

The stile assembly station includes an automated lock block delivery system whereby lock blocks 130 are introduced by an automated lock block picking and placing device, such as a mechanical arm, which retrieves the lock blocks 130 from a carrier device, which is illustrated as another fork lift 30 in FIG. 2. The automated lock block picking and placing device selectively places lock blocks 130 for delivery to two conveyor belts 132, 134 that deliver the lock blocks 130 to respective lock block indexing devices 136, 138 in the form of rollers which deliver the lock blocks 130 one-by-one to the left side of the frame assembly jig 101 and one-by-one to the right side of the frame assembly jig 101.

Both the stiles 120 and the lock blocks 130 are moved to lock block attachment stations 139a, 139b. At the lock block attachment stations 139a, 139b, the lock blocks 130 receive adhesive from a pressurized nozzle and are positioned in front of a respective stile 120 in order to be affixed to the associated stile 120. Each stile 120 moves in the direction of the arrows depicted at the stile indexing devices 126, 128. In the preferred embodiment, the lock blocks 130 are attached to the stiles 120 via adhesive, for example a hot melt adhesive, but the lock blocks may be attached by a mechanical fastener, or a combination of adhesive and mechanical fastener. While FIG. 2 depicts a single lock block 130 being attached to each stile 120 on the right and left sides of the frame assembly jig 101 at the lock block attachment stations 139a, 139b, optionally only a single lock block 130 may be attached at one of the lock block attachment stations 139a, 139b. Optionally, multiple lock blocks may be attached to the stiles 120 at the stations 139a, 139b. The movement and handling of all the components in frame assembly station 100 may be handled manually or automatically by robotic systems such as pick and place robotic arms, robotic indexers, and the like. In the illustrated embodiment, the rails 110, the stiles 120, and the lock blocks 130 are handled automatically.

Each lock block 130 is secured to its associated stile 120 preferably through use of a thermoplastic hot melt adhesive, fastener, or combination thereof. The adhesive is preferably a viscous, fast setting adhesive that is applied to either the lock block 130 and/or the stile 120 at a point in the production line that allows the lock block 130 to be brought into engagement with the stile 120 before the adhesive has set. The bond strength is such that the lock block remains secured to the stile 120 during the frame assembly process. The assembled frame is thereafter transferred onto the associated door skin and thereafter the assembled door layup is transported to the press 420, as described in greater detail below.

As discussed in more detail below, the central framing section includes a frame assembly jig 101 for supporting and holding the rails 110 and stiles 120 by raised arms until four clamps 180a, 180b, 180c and 180d grasp the frame at the corresponding four corners where the rails 110 and stiles 120 abut during the attachment process to allow the frame 150 to be self-supporting. Thereafter, the assembled frame 150 is passed to a conveyor for delivery to the adhesive coating station while another door frame 150 is assembled on the frame assembly jig 101.

Figure 2B:
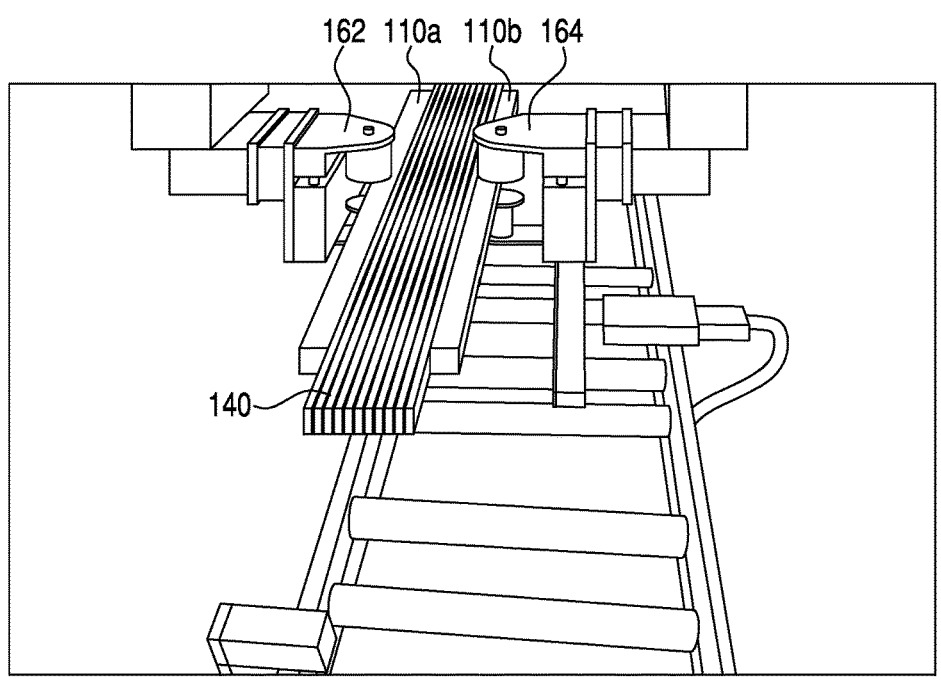
FIG. 2B is an enlarged partial view of the frame assembly station of FIG. 2, depicting the rail grippers moving apart the rails to thereby expand the attached core as the distance between the rails is made to match a length of an associated stile.

FIGS. 2A-2F collectively illustrate a frame assembly process performed at the frame assembly jig 101. FIG. 2B illustrates the rails 110a, 110b and the core 140 after being assembled at the core attachment station 142 where the core 140 is adhesively adhered between and to a pair of rails 110a, 110b. A pair of rail grippers 162, 164 grasps the rails 110a, 110b and deliver the rail/core assembly to the frame assembly jig 101. As best shown in FIG. 2B, the rail grippers 162, 164 are configured to increase the distance between rails 110a, 110b to thereby expand the core 140 as the distance between the rails 110a, 110b is made to match a length of an associated stile 120.

Figure 2C:
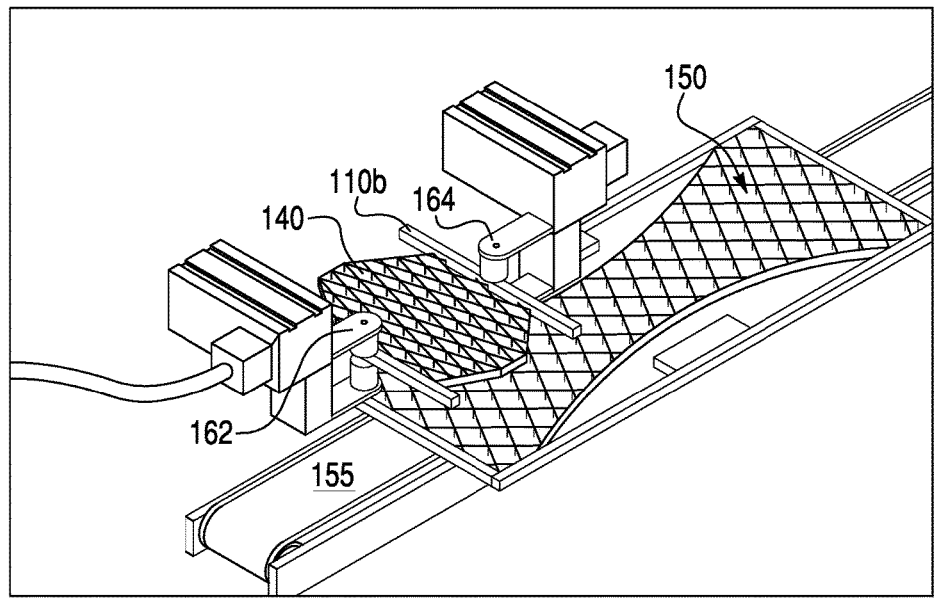
FIG. 2C is an enlarged partial view of the frame assembly station of FIG. 2, depicting the rail grippers delivering the rails and core to a frame assembly jig.
Figure 2D:
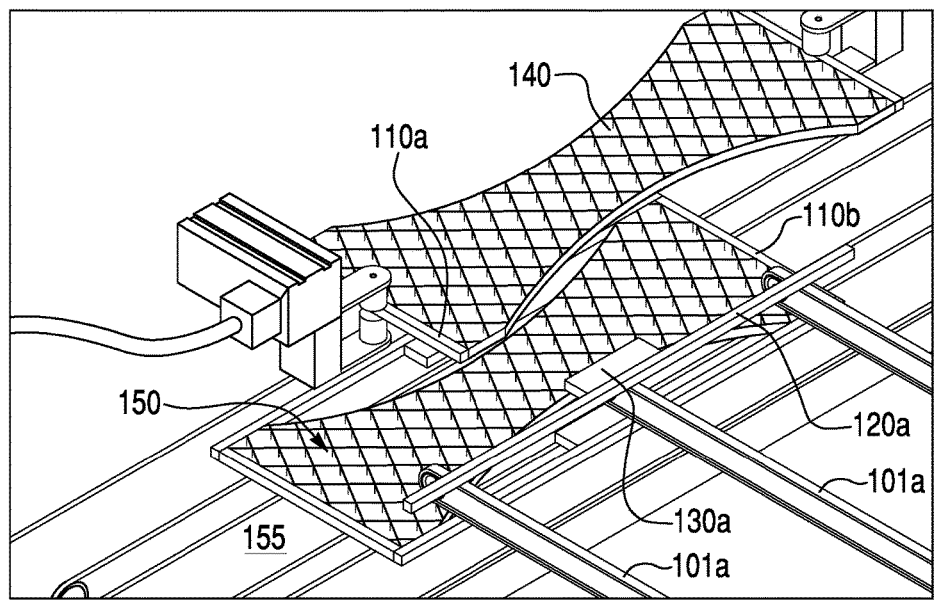
FIG. 2D is an enlarged partial view of the frame assembly station of FIG. 2, depicting a stile, which includes an associated lock block affixed thereto, being delivered by arms to the frame assembly section.

FIG. 2C depicts the rail grippers 162, 164 delivering the rails 110a, 110b and the core 140 to the frame assembly jig 101. As best shown in FIG. 2D, an assembled frame 150 is shown on the lower conveyor 155. FIGS. 2C and 2D are additional views illustrating the assembled frame 150 on the lower conveyor 155 while the rail grippers 162, 164 reach the frame assembly jig 101. FIG. 2D also illustrates a stile 120a, which includes an associated lock block 130a affixed thereto, being delivered by arms 101a to frame assembly section.

FIG. 2E depicts the frame assembly jig from a different angle than the angle shown in FIGS. 2C and 2D. In FIG. 2E, an assembled frame 150a is shown with another rail/core assembly 143 suspended above the previously assembled frame 150a. The assembled frame 150a is held in place by four clamps 180a, 180b, 180c and 180d (FIG. 2) positioned at the four corners of frame 150a while the rail grippers 162, 164 (FIG. 2C) deliver the next rail/core assembly 143 to the frame assembly jig 101. Also shown in FIG. 2E is another pair of stiles 120 with associated lock blocks 130 on opposite sides of the rail/core assembly 143. The additional stiles 120 are delivered by arms 101a to the frame assembly jig 101 for adhesion to the rail/core assembly 143 while the four clamps 180a, 180b, 180c and 180d release the assembled frame 150a onto the conveyor 155.

In the preferred embodiment, there are three arms 101a on each side of the frame assembly jig 101 and each arm 101a is provided with conveyor belts 101b that are driven by motorized rollers 101c mounted at the end of each arm 101a. The conveyor belts 101b convey the stiles 120 to the frame assembly jig 101. Once the four clamps 180a-180d grasp the assembled frame 150, the arms 101a retract to permit the assembled frame 150 to interact with and be transported by the conveyor 155 disposed below the jig 101.

As best seen in FIG. 2E, the core 140 dangles or bows downwardly due to its weight because it is held in place only by way of its adhesion to the rails 110 that are suspended by the rail grippers 162, 164. The core 140 is expanded cardboard or like paper-like material and thus has little structural strength when so suspended.

FIG. 2F depicts the frame assembly jig 101 assembling a frame while the immediately previously assembled frame 150 is transported by the conveyor 155 from the jig 101 to the adhesive coating station described below.

As described above, the assembly of the attached lock block 130 and the stile 120 and the assembly of the attached rails 110a, 110b and core 140 are transferred to the frame assembly area and supported by frame assembly jig 101. Robotic handling devices such as a clamp and gantry system may be used to deliver the frame components to the frame assembly jig 101. After the expandable core 140 is adhered to the rails, the rails 110a, 110b are drawn apart to expand the core 140. The rails 110a, 110b and stiles 120 are then secured together to form the assembled frame 150. The rails 110a, 110b and stiles 120 may be attached to one another using mechanical fasteners, adhesive, for example, a hot melt adhesive, or any combination of fasteners and adhesive. In various exemplary embodiments, different combinations of the lock blocks, the stiles, the rails, and the core may be delivered to the production line. It should be noted that the term frame 150 used throughout the rest of this description includes the assembled stiles 120, rails 110, optional lock block(s) 130, and optional core(s) 140.

Figure 3:
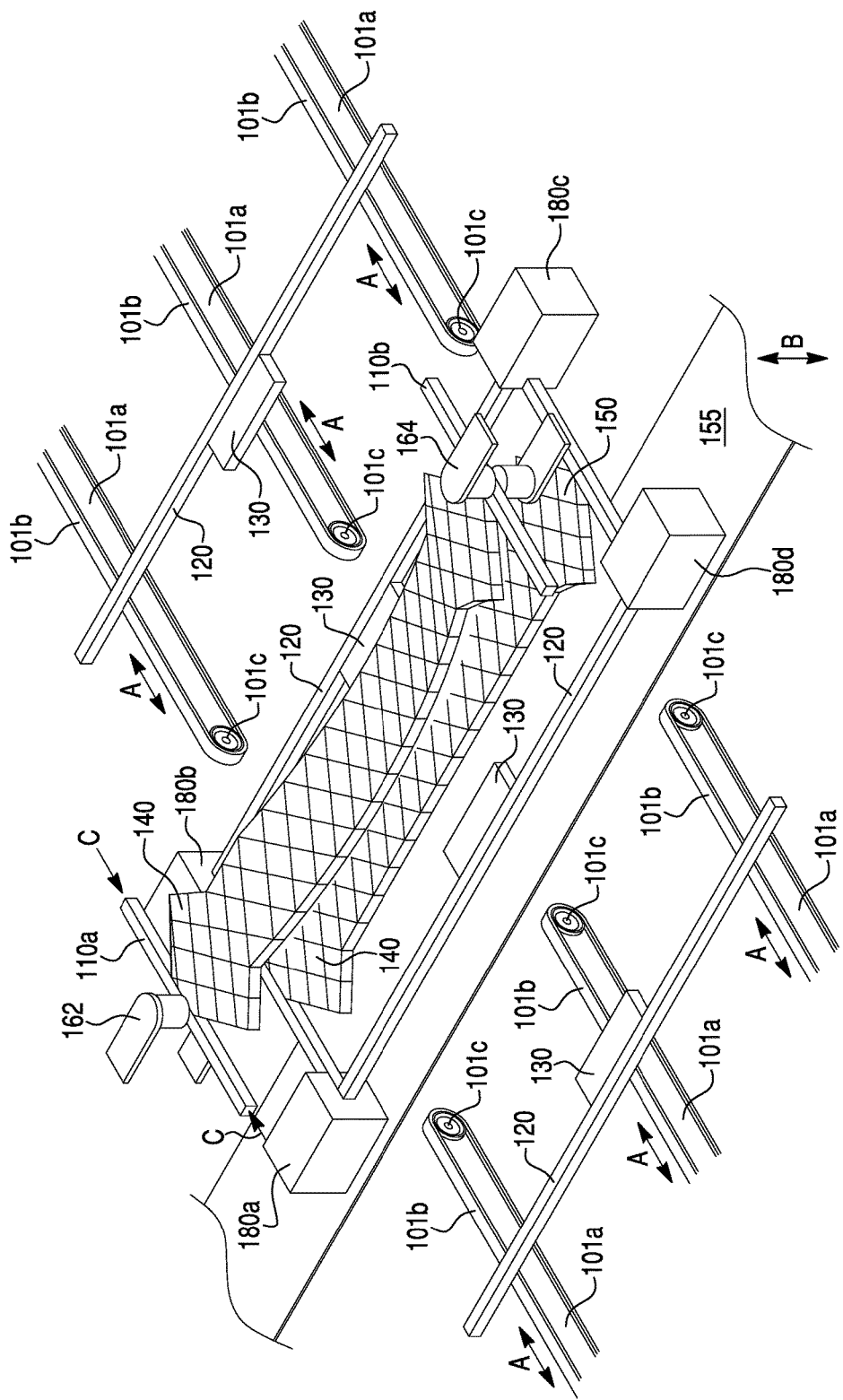
FIG. 3 is a schematic of the frame assembly jig according to the present invention with an assembled frame being suspended by four clamps while rail grippers expand a rail/core assembly above the frame conveyor.

FIG. 3 is a schematic of the frame assembly jig 101 according to the present invention with an assembled frame 150 suspended by four clamps 180a, 180b, 180c and 180d while rail grippers 162, 164 expand a rail/core assembly above the frame conveyor 155. As best shown in FIG. 3, the arms 101a of the frame assembly jig 101 deliver stiles 120 from opposite sides of the jig 101. The arms 101a include conveyor belts 101b driven by motorized rollers 101c at the terminal ends of each arm 101a. Each arm 101a reciprocates in the direction of arrow 'A' in order to deliver a stile 120 to the assembly area where it is clamped to the rails 110a, 110b by the clamps 180a, 180b, 180c and 180d. In order to facilitate transfer of the assembled frame 150 from the clamps 180a-180d to the conveyor 155, the conveyor 155 moves in the vertical direction, designated by arrow 'B', toward the assembled frame 150 suspended above the conveyor 155 so that the assembled frame 150 comes to rest on the conveyor 155 when released by the clamps 180a-180d without unwanted force of being dropped from the clamps 180a-180d onto the conveyor 155. Alternatively, the assembled frame 150 may be moved vertically downward to come to rest on the conveyor 155.

In operation, the clamps 180a-180d release the assembled frame 150 onto the conveyor 155 after a clamping period sufficient to permit the adhesive to cure sufficiently to maintain the connection between the rails 110 and the stiles 120. The adhesive that secures the rails 110 and the stiles 120 may be a thermoplastic hot melt that achieves a nearly instantaneous bond. The adhesive is relatively viscous in order to allow it to remain affixed to the rails 110 and the stiles 120 without dripping. Unlike the adhesives securing the lock blocks 130 to the stiles 120 and the core 140 to the rails 110, the adhesive securing the rails 110 to the stiles 120 is relatively flexible and tacky, allowing the resulting frame 150 to be squared up as elsewhere explained. The adhesive is applied to the rails 110 by being extruded under pressure through nozzles. Then, the clamps are moved to a position adjacent the opposite ends of the rails 110a, 110b being delivered to the jig 101 in preparation for assembling the next door frame.

It is noted that each clamp 180a, 180b, 180c and 180d shown in FIG. 3 is provided with an adhesive extrusion system, including a reservoir, associated tubing connected to an extrusion nozzle, and a pump for transporting the adhesive from the reservoir to the nozzle through the tubing, which includes one or more nozzles. When the clamps 180a-180d are positioned adjacent the opposite ends of the rails 110a, 110b, the clamps 180a-180d extrude an appropriate amount of adhesive onto the ends of the rails 110a, 110b. The pressurized adhesive extrudate, for example, is sent in the direction of arrows 'C' with respect to the rail 110a shown in FIG. 3 and in the similar direction with respect to the rail 110b. The adhesive is thus applied to exposed ends of the rails 110, which are joined to edges at the ends of the stiles 120. While it is preferred to use extruded adhesive for fastening the corners of the stiles 120 and the rails 110 together, mechanical fasteners may alternatively be used either separately or in conjunction with adhesive, such as applied through use of nail guns, corrugated fasteners and the like. Yet alternatively, the stiles 120 and the rails 110 may be connected through use of appropriately dimensioned and configured tongue and groove joints or other profiled joints sufficient to hold the resulting frame together for placement on a door skin, with the door skin having an appropriately located adhesive to secure the door frame to the door skins.

After the adhesive is applied to the ends of the rails 110a, 110b, the respective stiles 120 are delivered from the arms 101a to the assembly area where the stiles 120 are positioned adjacent the ends of the rails 110a, 110b and clamped by the clamps 180a, 180b, 180c and 180d. It will be understood by those of skill in the art that the clamps 180a-180d are designed for movement within the space defined by the jig 101 between the clamping position shown in FIG. 3 to an extrusion position adjacent the rails 110a, 110b. Additionally, the clamps 180a-180d are provided with suitable extrusion mechanisms to accomplish the foregoing extrusion operation.

With reference to FIGS. 1A and 1B, it is noted that the frame assembly jig 101 supplies assembled frames 150 to the conveyor 155 for further processing by the door production line. In the preferred embodiment, a second frame assembly station 100' is provided that has the same features and structures as the frame assembly station 100 described above. Like the frame assembly station 100, the second frame assembly station 100' uses automated technology to manufacture assembled door frames 150' which are the same as door frames 150 and these door frames 150' are delivered downstream via conveyor 155' for further processing as described below. As best shown in FIG. 1A, the second frame assembly station 100' includes all of the same structure as the first frame assembly station 100. Like parts are labeled with like reference numerals, except that the reference numerals of the second frame assembly station are indicated with a prime '.

After each frame 150, 150' is assembled, either through the assembly system and process described above or preassembly, the frame 150, 150' is moved to an adhesive coating station 210, 210' and adhesive coating and layup station 200. In the interest of brevity, only the first frame 150 and first adhesive coating station 210 are discussed below. The adhesive coating station 210 is capable of applying an adhesive to both sides of the frame 150. Adhesive application may be accomplished by passing the frame 150 through a double roll coater of the frame adhesive station 210. In an exemplary embodiment, the roll coater applies adhesive to the frame 150 in an amount between about 6 and about 25 g/sft (grams per square foot) as measured on the surface of the stiles 120 and the rails 110. In various exemplary embodiments, the amount of adhesive is between about 15 and about 20 g/sft. This amount of adhesive is believed to assist quality issues, such as by preventing pillowing or peeling of the door skin from the frame 150. After the adhesive is applied, the frame 150 is transferred to door skin assembly stage of the adhesive coating and layup station 200. The adhesive is preferably a reactive hot melt adhesive or a polyurethane reactive (PUR) hot melt adhesive. The adhesive has an open time of about 90 seconds, sufficient to allow the door to be assembled, transported to the pressing station 400 and thereafter pressed. The adhesive has an extended open time and high tack. Full cure of the adhesive typically takes 24 hours or more. If a PUR is used, the moisture needed for the reaction is available from the 6% to 8% moisture content of the door skins and the 6% to about 10% moisture content of the stiles/rails.

Referring to FIG. 1B, it will be understood that the frame assembly stations 100, 100' deliver assembled frames 150, 150' via conveyors 155, 155' which run parallel to each other. The frame adhesive coating station 210 will now be described and it will be understood by those of skill in the art that a similar frame adhesive coating station 210' receives door frames 150' in the same manner as described below with respect to the frame 150. It should further be understood that third, fourth, fifth, and other production lines with corresponding stations may be provided.

The frame 150 is delivered to the frame adhesive coating station 210 via conveyor 155. As the frame 150 passes through the frame adhesive coating station 210, adhesive is applied to both opposite sides of the frame 150, while a first door skin 220 is delivered from the door skin delivery station 300 via conveyor 310 (See FIG. 1B). The door skin 220 is delivered automatically to a bottom skin layup area 205 and located by positioning members within a bottom skin layup area 205 downstream of frame adhesive coating station 210. At the bottom skin layup area 205, the door skin 220 is located downstream of the frame adhesive coating station 210 and the frame 150 exiting the adhesive coating station 210 is retrieved by robotic handling device 212 described below. The robotic handling device 212 (see FIG. 1B and FIGS. 4A-4C) is configured to retrieve the assembled frame 150 after application of adhesive, and thereafter place the assembled frame 150 onto the door skin 220 which has been located in the bottom skin layup area 205. After the assembled frame 150 has been placed onto the door skin 220, the frame/skin assembly is conveyed to a top skin layup area 215.

Figure 4A:
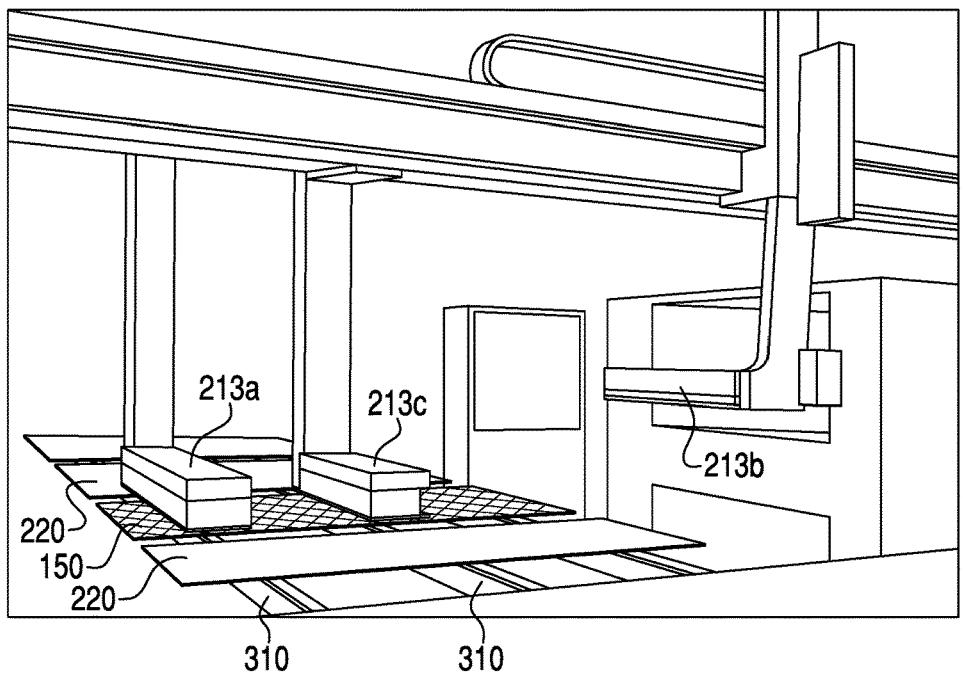
FIGS. 4A-4C are partial views depicting the frame handling arms which retrieve the door frame from the adhesion station and place the door frame onto the bottom door skin at the bottom skin layup station.
Figure 4B:
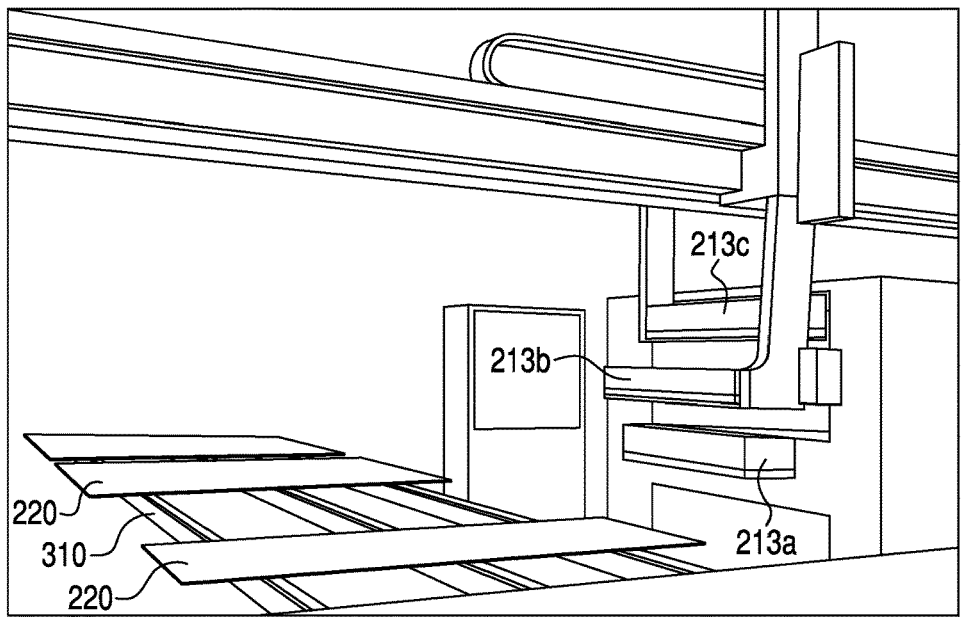
Figure 4C:
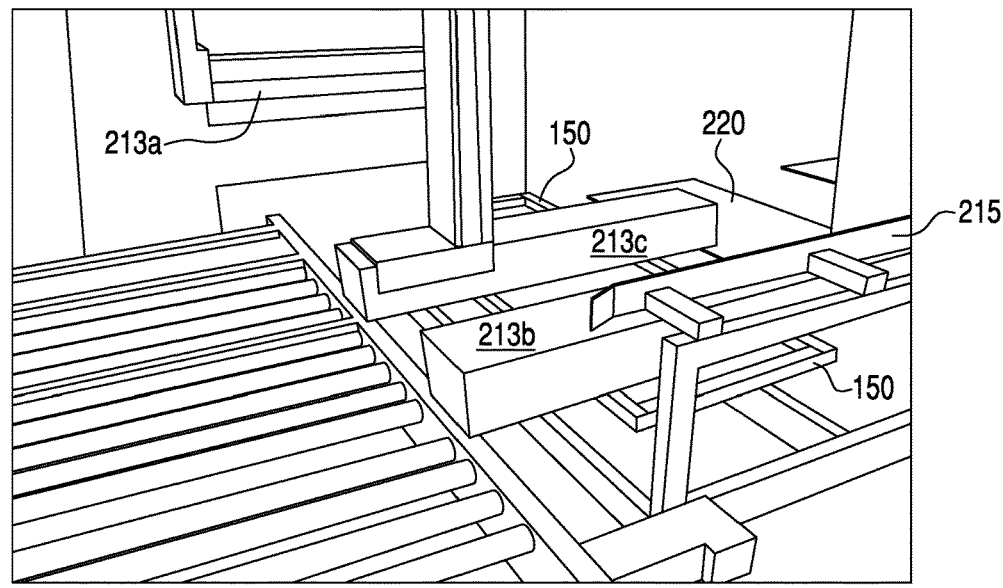

As shown in FIG. 1B and FIGS. 4A-4C robotic handling devices 212, 212' are utilized at bottom skin layup areas 205, 205' to retrieve the door frame 150, 150' exiting the frame adhesive coating station 210, 210'. In the preferred embodiment, the robotic handling device 212 includes three synchronized handling arms 213a, 213b, 213c which retrieve the assembled frame 150 via gripping rollers as it exits the frame adhesive coating station 210 and locate the frame 150 onto the respective bottom door skin 220. The three handling arms 213a-213c are synchronized such that two of the three arms 213a-213c (213a and 213c in FIG. 4A) place an assembled door frame 150 onto a bottom door skin 220 while the third handling arm (213b in FIG. 4A) begins to retrieve the next door frame 150 from the adhesion station 210. FIG. 4C also shows an alignment plate 215 for aligning with and squaring the door frame 150 prior to the door frame 150 being placed onto the bottom door skin 220, as will be described in more detail below.

Figure 4D:
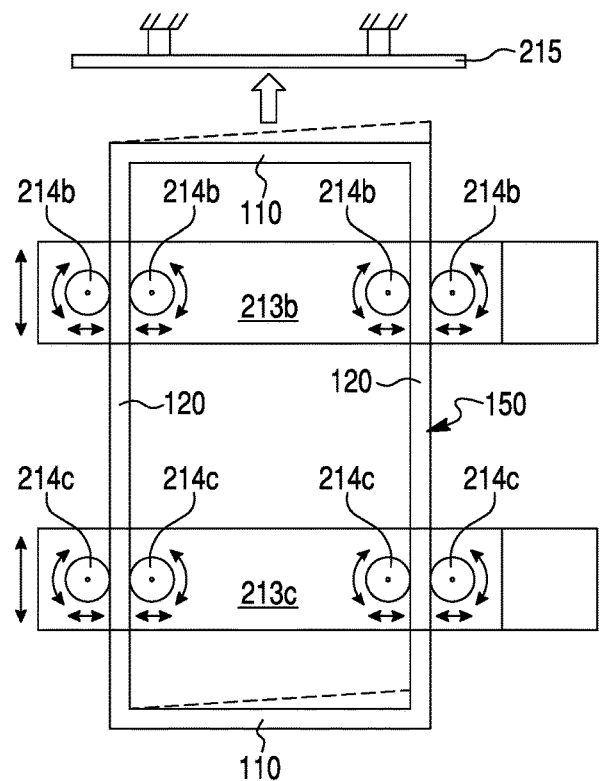
FIG. 4D is a schematic showing the frame handling arm used in conjunction with an alignment mechanism for squaring the door frame during the layup process.

With reference to FIG. 4D, the handling arms 213b, 213c are schematically shown gripping the door frame 150. Each handling arm 213b, 213c comprises gripping rollers 214b, 214c that grip opposite vertical surfaces of each stile 120 of the door frame 150. The gripping rollers 214b, 214c are rotatably mounted on the handling arms 213b, 213c and reciprocate toward and away from the stiles 120 to perform the gripping action. During operation, two of the handling arms 213b, 213c selectively grip a door frame 150 exiting the adhesive coating station 210 with the gripping rollers 214b, 214c and deliver the frame 150 toward the bottom skin layup areas 205. Prior to placing the door frame 150 onto the bottom skin 220, the handling arms 213b, 213c drive the forward rail 110 against the alignment plate 215 in order to square-up the door frame 150 which may have shifted or become misaligned during transport along the conveyor 155 and through the adhesive coating station 210. More specifically, the door frame 150 is pushed against the alignment plate 215 and, if the door frame is not square (see dotted lines in FIG. 4D), the rail 110 will be pushed until it is flush against the alignment plate 215 to square the door frame 150. The gripping rollers 214b, 214c are adapted to rotate during the alignment process. In the preferred embodiment, the alignment plate 215 may be moved horizontally into and out of the bottom skin layup areas 205 to contact the door frame 150 and then move out of the layup area 205 during placement of the door frame 150 onto the bottom door skin 220. The second production line (designated with primes ') operates in the same manner.

Figure 8:
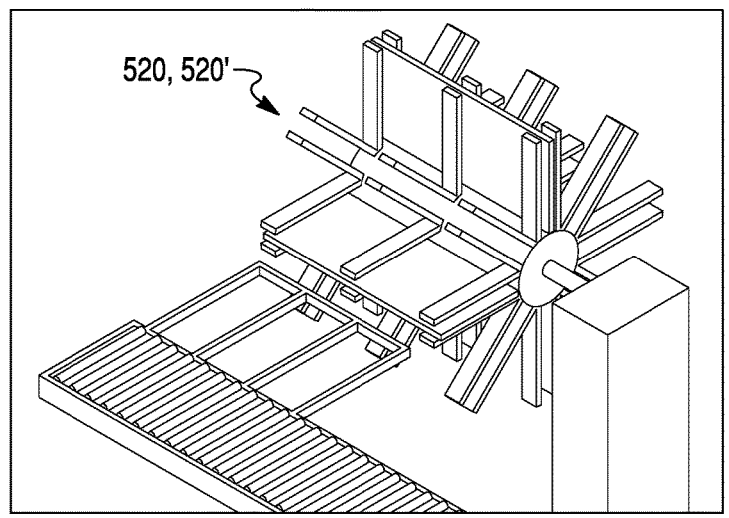
FIG. 8 depicts an exemplary motor-driven star conveyor.

With reference to FIG. 1B, the door skin delivery station 300 provides a system for delivering door skins 220 to the door assembly stage of the adhesive coating and layup station 200. More specifically, the door skin delivery station 300 includes an operator O2 who places by hand a series of door skins 220 onto conveyor 305 and a second operator O3 who places by hand a series of door skins 230 onto conveyor 315. The door skins 220 are conveyed to a flipper, preferably in the form of a star conveyor 308, where the door skins 220 are flipped over so that their intended outer surfaces rest on the conveyor and thereby expose the intended inner surfaces of the door skins 220. An exemplary star conveyor 308 is shown in FIG. 8. The flipped door skins 220 are conveyed by conveyor 310 to the bottom layup area 205 or 205'. The door skins 230 are conveyed by conveyor 315 to conveyor 320 without being flipped (so that their interior surfaces rest on the conveyor 320), and the door skins 230 are then conveyed by the conveyor 320 to the top skin layup area 215 or 215'.

As evident from FIG. 1B, the door skin assembly station 300 includes a first skin feeder and a second skin feeder. The skin feeders may include a door skin pallet or multiple pallets of the door skins 220 and 230. In the exemplary embodiment, the first skin conveyor 310 provides bottom door skins 220 and the second skin feeder 320 provides top door skins 230. The top and bottom door skins 220, 230 may be any variety of door skins including wood composite door skins, solid wood door skins, polymer door skins, sheet molding compound door skins, fiberglass-reinforced skins, molded door skins, steel door skins, and flush door skins. Although two skin conveyors 310, 320 are shown, a single skin conveyor may be utilized which provides both the top and bottom door skins 220, 230. Alternatively, additional conveyors may be provided.

Door skins 220, 230 may be unloaded from the pallets P and placed onto the conveyors 305, 315 either manually or through a robotic handling device such as a vacuum gantry. If the door skins 220, 230 are removed from the pallets P manually, the operators O2, O3 moving the door skins 220, 230 may also perform a visual quality inspection. If a door skin 220, 230 is found to be unsatisfactory, the operator may place it on a disposal conveyor (not shown). If the door skin 220, 230 is found to be acceptable, the operator(s) O2, O3 places it on a production conveyor. Alternatively, the door skin 220, 230 may be removed from the pallets P with an automated device and a camera or set of cameras may be oriented and directed so that a remote operator can perform visual inspection. The operator O2, O3 is then able to determine if the door skins 220, 230 are acceptable and signal the robotic handling system to place the door skins 220, 230 on either the production conveyor or the disposal conveyor. In various exemplary embodiments, the inspection may be performed automatically by tactile inspection devices, such as touch probes, and/or non-tactile inspection devices, such as laser or optical sensors. For example, a camera may optically capture the image of a door skin 220, 230. The image may then be processed and measured by a controller or microprocessor. If the door skin 220, 230 is acceptable, the controller/microprocessor can signal the robotic handling device to place the door skin 220, 230 on the production conveyor 305, 315. If the door skin 220, 230 is not accepted, the controller/microprocessor signals the robotic handling device to place the door skin 220, 230 on the disposal conveyor.

Figure 5A:
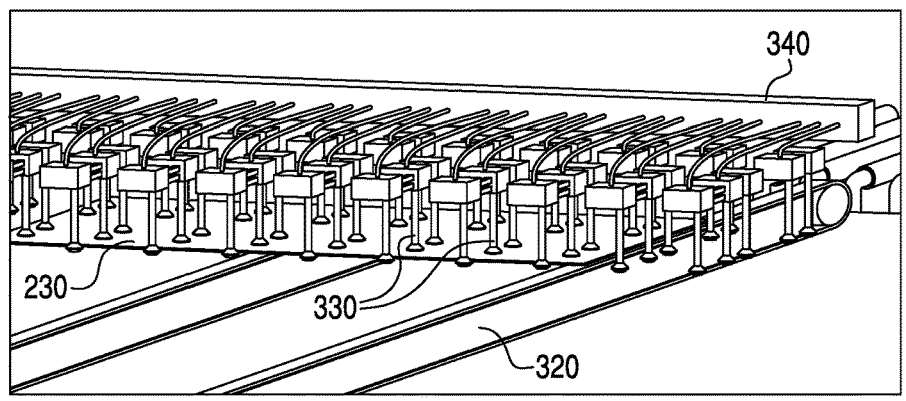
FIGS. 5A-5C are partial views depicting a top skin layup station and a pick-and-place mechanism that utilizes suction cups to lift and place a top skin onto an assembled frame at a top skin layup station.
Figure 5B:
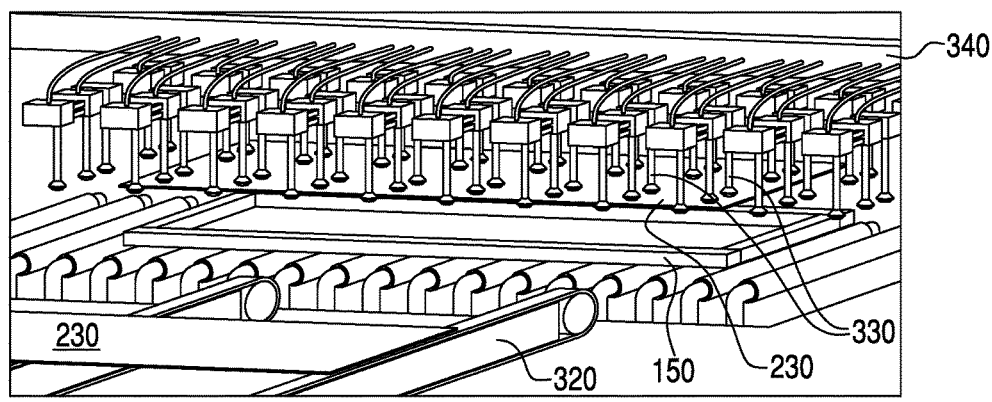
Figure 5C:
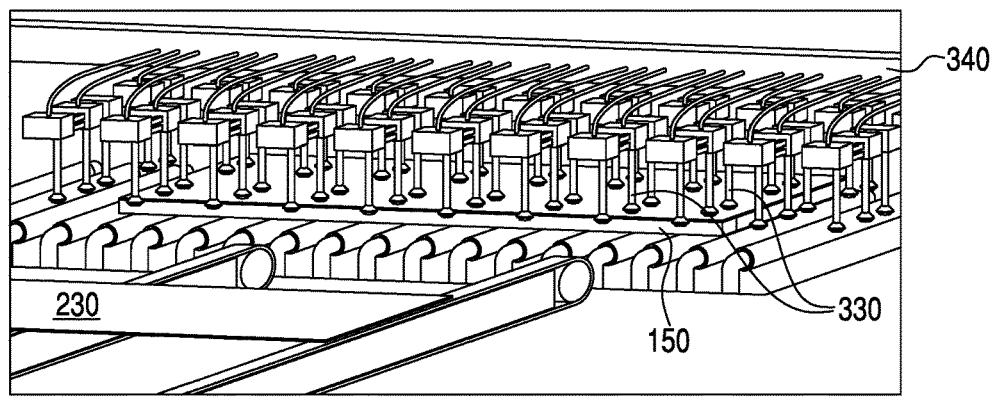

Turning now to the top skin layup station, the top door skin 230 is moved to the top door skin layup station 215 or 215'. At the top door skin layup station 215 or 215', the top door skin 230 is placed onto the frame 150 or 150' opposite the bottom door skin 220 so that the interior surface of the top door skin 230 faces downwardly towards the frame 150 or 150'. In the preferred embodiment, the top door skin 230 is lifted from conveyor 320 by a vacuum cup lifting structure, for example, as best shown in FIGS. 5A-5C. As best depicted in FIG. 5A, the top door skin is lifted from the conveyor 320 by an array of pneumatically-actuated vacuum cups 330 mounted to a movable support structure 340. As best shown in FIG. 5B, the door skin 230 is positioned above a respective door frame 150, 150' placed on a bottom skin at layup station 205, 205'. As best shown in FIG. 5C, the top door skin 230 is then placed onto the frame 150, 150'. Various stops, limits, tactile sensors, and non-tactile sensors may be used to align and position the door skin 230 and the frame 150, 150' so that the door frame is squared prior to receiving the door skins 220, 230 at the layup stations 205, 205', 215, 215'.

Referring now only to the first assembly line in the interest of brevity, after the top door skin 230 is placed onto frame 150, the assembled door layup is transferred to a pressing station 400 where the door is pressed to more fixedly bond the door skins 220, 230 to the frame 150 having the core 140. As discussed above, because the production line is automated, each step is performed at the set rate of movement to avoid bottlenecks. For example, the amount of time for the lock block attachment station(s) 139a, 139b to attach the lock blocks 130 to the stiles 120 is equal to rate of movement, the time for the frame 150 to be transferred to the adhesive coating and layup station 200 equals the rate of movement, and the time in between completed doors coming off the production line is equal to the rate of movement. In various exemplary embodiments, the rate of movement of the presently described system is about 7 seconds to about 15 seconds, for example about every 8 seconds, though the time may vary depending on several factors such as the adhesive selected, as would be understood by one of ordinary skill in the art upon viewing this disclosure. The rate of movement may not be long enough, however, for sufficient bond strength to form between the door skins 220, 230 and the frame 150.

Figure 6A:
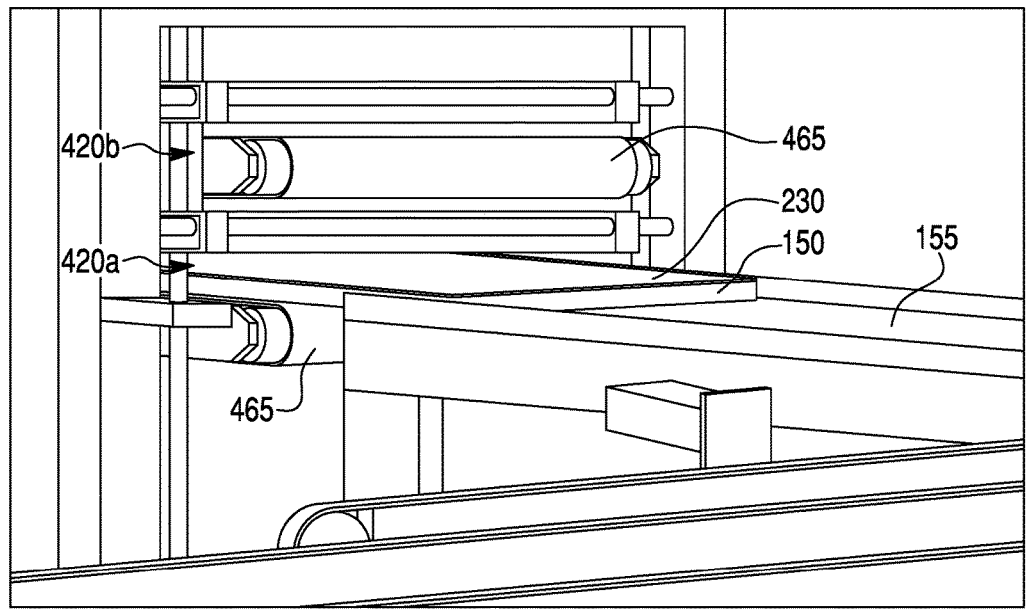
FIGS. 6A-6E are partial views respectively depicting the vertically movable two-press pressing station at various stages of operation.

As best shown in FIGS. 1B and 6A-6E, the double press 420 allows for a pressing time that at least achieves the required throughput of pressing station 400, 400'. Again in the interest of brevity, only pressing station 400 is discussed below, with the understanding that pressing station 400' operates in a like manner. Although the pressing station 400 is depicted with a double press 420, it should be understood that the pressing station 400 may include three, four, or more presses. Each of the presses has a pair of spaced, movable platens operated by a hydraulic system. The double press 420 includes a lower press 420a and an upper press 420b. FIG. 6A depicts an assembled door layup (with frame 150 and door skin 230) entering the first press 420a aligned with the conveyor 155. The assembled door layup is passed to a conveyor located in the first press 420a. In accordance with the preferred embodiment, the press thereafter is indexed down to align the second press 420b with the conveyor 155. The press 420 reciprocates vertically in response to its supporting hydraulic actuators in order to move the presses 420a, 420b vertically in tandem with one another. The presses are alternatingly moved between a loading/unloading position and a pressing position. When either one of the presses 420a, 420b is in its loading/unloading position, that press 420a or 420b is in operative alignment with the loading and discharging material handling and movement devices, e.g., conveyor 155, to receive at least a first assembled door layup delivered by the loading material handling and movement device and to discharge at least a second assembled door that has been pressed to the discharging material handling and movement device. The platens of the press 420a or 420b in the loading/unloading position are in an open state or mode to receive at least the first assembled door layup and to discharge at least the pressed second assembled door. At the same time, the other press 420a or 420b in the pressing position has its respective platens closed for pressing at least a third assembled door layup. The press 420a or 420b in the pressing position is out of operative alignment with the loading and discharging material handling and movement devices, e.g., conveyor 155. As shown in the drawings, in the "closed" state, the platens of the press 420a or 420b do not necessary contact one another as they apply pressure to the assembled door layup.

Figure 6B:
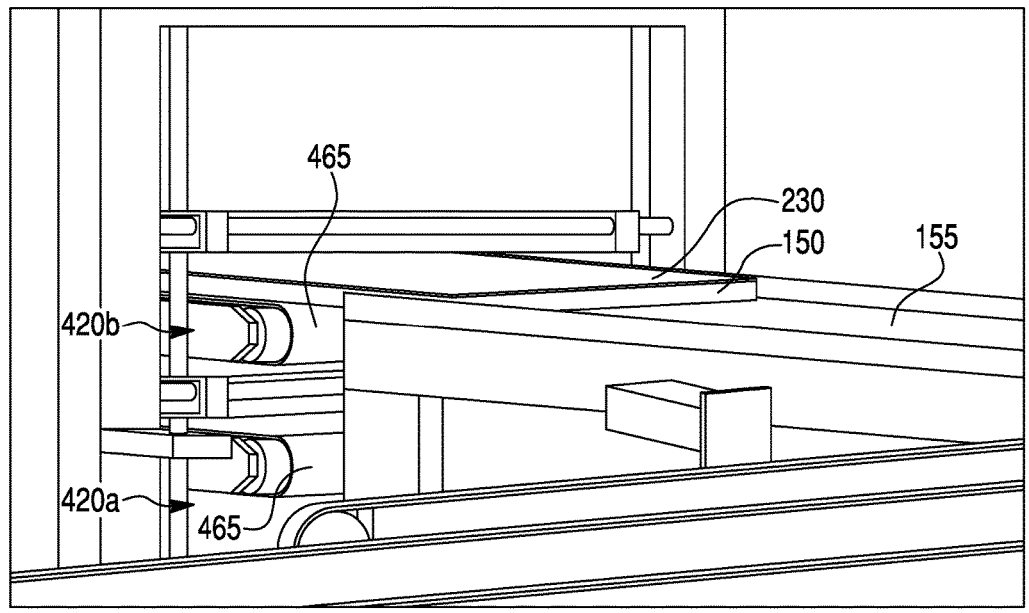
Figure 6C:
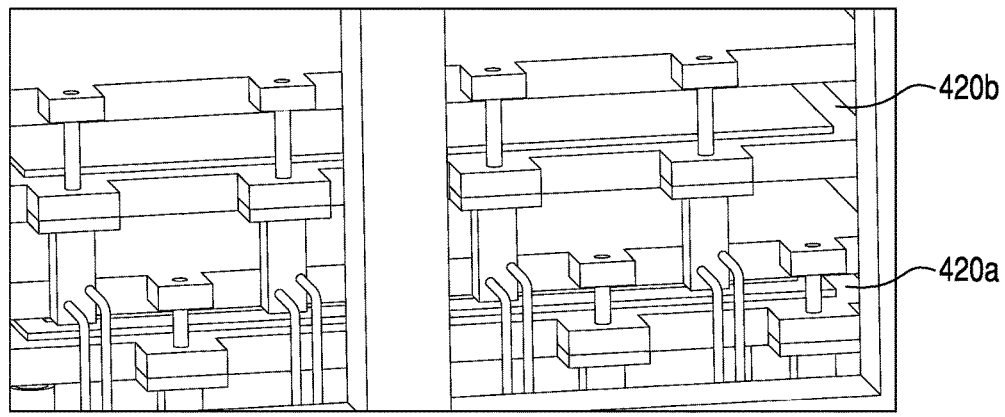
Figure 6D:
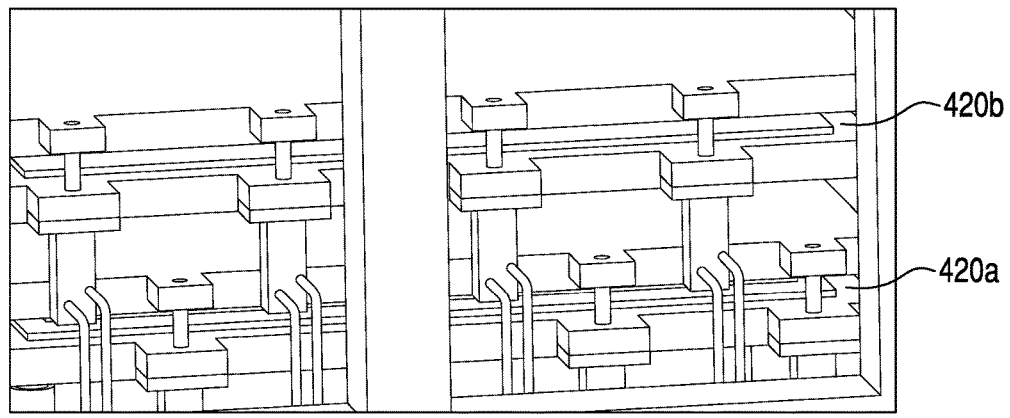

The alternating cycle of the press 420 assures that one press 420a, 420b is pressing an already assembled door layup while the other press 420a, 420b is either receiving an assembled door layup and/or discharging an assembled door after having been pressed. FIG. 6C depicts the pressing station 400 wherein an assembled door layup is being received into the top second press 420b as shown in FIG. 6B. In FIG. 6D, the second (top) press 420b is being closed to press the assembled door layup and the pressing station 400 is thereafter indexed to align the (lower) first press 420a with the conveyor 155 as shown in FIG. 6A. Using the double press 420, the pressing of assembled door layups is alternated between the lower and upper presses 420a, 420b, with the result that an assembled and fixed door exits each press 420a, 420b after having been pressed for a period sufficient to bond the skins 220, 230 to the frame 150. An assembled door layup can therefore undergo a pressing operation, which may include opening and closing the platens of the lower and upper presses 420a, 420b, for approximately twice as long as the rate of movement. The extra press time allows a greater bond to be created between the door skins 220, 230, and the frame 150 and the core 140.

In various exemplary embodiments, the press imparts approximately 100 psi to the door skins 220, 230 adjacent the stile and rail sections. The principal bonding of the skins 220, 230 occurs along the stiles 120 and the rails 110, the areas where the maximum pressure is applied. The pressure along the remaining areas of the door skins 220, 230 covering the core 140 varies.

The double press 420 is capable of rapid closure. For example, an upper platen and a lower platen in each of the lower and upper presses 420a, 420b of the double press 420 are capable of transitioning from an open position to a closed state of contacting the door skins 220, 230 and reaching a final pressure in fewer than 10 seconds. In various exemplary embodiments, the double press 420 is capable of reaching final pressure in approximately one second or less. A fast closing double press 420 allows for a faster acting adhesive to be used and therefore quicker set and cure times.

Figure 6E:
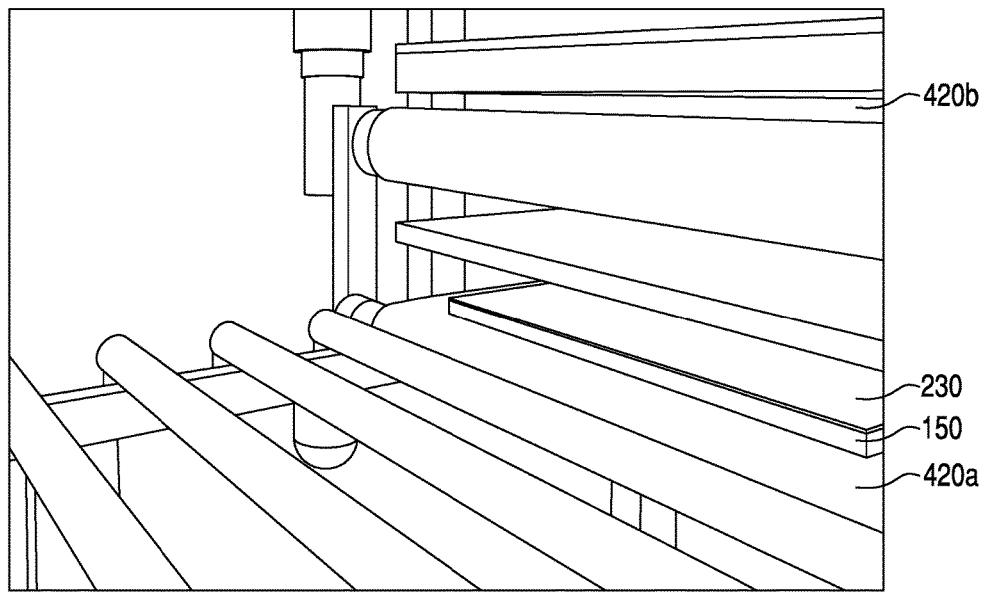

In various exemplary embodiments, one of the upper and lower platens or both platens may be moved towards or away from the assembled door layup. As best shown in FIGS. 6C and 6D, actuators, such as hydraulic or pneumatic cylinders, may be connected to the upper platen. FIG. 6E depicts an assembled and pressed door (frame 150 and top skin 230) leaving the lower first press 420a and passing onto the discharge conveyor. FIGS. 6B and 6C depicts the upper press 420b in an open position and the lower press 420a in a closed position. Each of the upper and lower press 420a, 420b may also include a conveyor 465, for example a belt conveyor or powered rollers as shown in FIG. 6A, to assist in loading and discharging the assembled and pressed door into and from the respective presses 420a, 420b. In FIGS. 6A, 6B, and 6E, the lower platens are hidden by the conveyors 465. The conveyors 465 remain within the respective presses 420a, 420b during pressing operation. The conveyors 465 are preferably made from a flexible material that is durable enough to withstand the pressure applied by the platens. In various exemplary embodiments, the conveyor 465 may include a first side and a second side with an open center section (not shown). The first and second sides may include belts or rollers and be positioned along the edges of the resulting door to contact the door skins 220, 230 adjacent the frame 150. The first and second side conveyors and open center section allow the lower platen to contact the central region of the bottom door skin 220 directly. Various other devices and methods allow for positioning the assembled door layups into the lower and upper presses 420a, 420b, for example a push rod, may also be used. The double press 420 may also include various stops, limits, tactile sensors, and non-tactile sensors may be used to align and position the door to square the frame 150 before pressing.

Figure 6F:
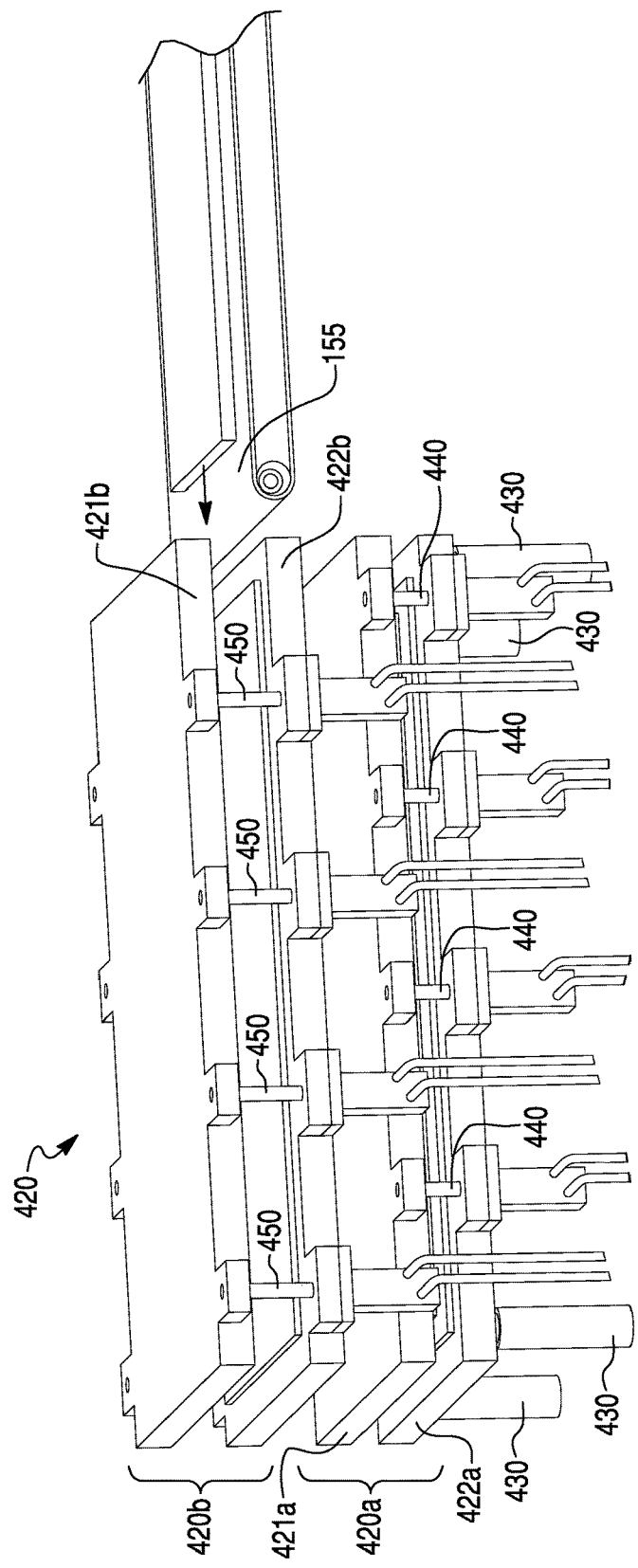

FIGS. 6F and 6G illustrate a schematic representation of the double press 420 in an upper position where the assembled door layup is delivered into the upper press 420b (FIG. 6F) and in a lower position where the assembled door layup is delivered into the lower press 420a (FIG. 6G). Movement of the entire press 420 between the upper position (FIG. 6F) and the lower position (FIG. 6G) is accomplished by hydraulic cylinder and piston assemblies 430. The lower press 420a includes an upper/top platen 421a and a lower/bottom platen 422a, and the upper press 420b includes an upper/top platen 421b and a lower/bottom platen 422b. Movement of the platens 421a, 422a of the first lower press 420a is accomplished by hydraulic cylinder and piston assemblies 440 interconnecting the lower platen 422a and the upper platen 421a. Movement of the platens 421b, 422b of the second upper press 420b is accomplished by hydraulic cylinder and piston assemblies 450 interconnecting the lower platen 422b and the upper platen 421b. As will be understood by one of skill in the art, the various hydraulic cylinder and piston assemblies may be driven by the hydraulic lines illustrated in FIGS. 6F and 6G.

Figure 7:
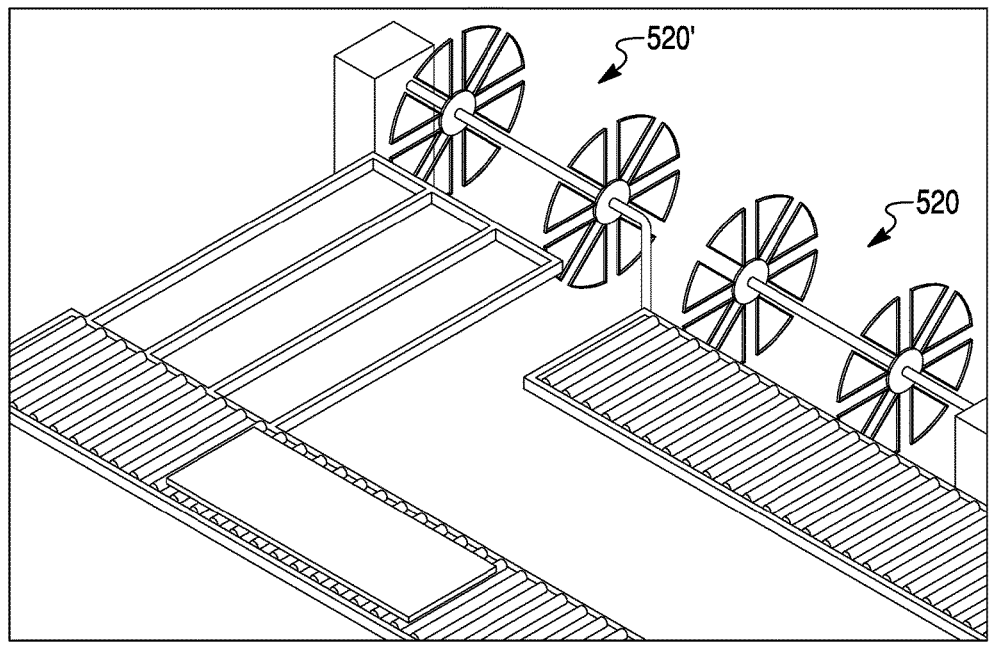
FIG. 7 depicts a pair of non-linear accumulators in the form of star conveyors.

As best shown in FIG. 1B, after leaving the pressing station 400, 400' (FIG. 1B), the assembled and pressed doors are then passed to an accumulator station 500, 500' preferably in the form of a non-linear accumulator 520, 520' that holds the assembled and pressed doors during a cooling and curing period. The accumulator 520, 520' thus reduces the footprint of the production line while the doors are curing before being sent for finishing as described below. FIG. 7 depicts a pair of non-linear accumulators 520, 520' in the form of star conveyors which receive the assembled and pressed doors from conveyors 155, 155', respectively, and rotate the assembled and pressed doors about an axis until the doors are discharged onto the single finishing conveyor 600 (FIGS. 1B and 1C). As best shown in FIG. 1B, these side-by-side accumulators 520, 520' transfer the doors assembled on parallel lines 155, 155' and pass through parallel presses 400, 400' onto a single conveyor 600. FIG. 8 depicts an exemplary motor driven, rotating star conveyor that has aligned and spaced cooperating arms that hold pressed doors of the type used as accumulators 520, 520'.

Although the exemplary embodiments discussed above are with respect to a double press 420, it should be understood that the pressing apparatus may alternatively have three, four, five, or more presses. As the number of presses increases, the pressing time per press can likewise increase without slowing the overall movement time. Moreover, the presses 420a, 420b may be placed side-by-side on the same level or otherwise oriented as opposed to the stacked relationship shown in FIGS. 6C and 6D. Various material handling devices, such as a switching conveyor, may provide the assembled door layups to the presses 420a, 420b, etc. in an alternating or successive fashion.

As best shown in FIG. 1C, after transiting the pressing stations 400, 400' and the accumulators 500, 500', the pressed assembled doors are moved along conveyor 600 to a number of optional finishing stations as needed. For example, a door may be passed through a stile trimming station 620 and a rail trimming station 640 to remove excess frame material. If the blades of the trimming stations 620, 640 are not parallel the door may need to be rotated between the stile trimming station 620 and the rail trimming station 640. After the edges have been trimmed, the door may be placed through an edge coating station 660 that applies a protective preferably colored coating to the exposed edges of the stiles. Because the stiles extend vertically in the assembled door, their edges are viewable to the user so the coating masks the edges and also provides a protective barrier. Here the edges of the door, such as the exposed rails 110a, 110b and stiles 120 may be coated, painted, laminated, or otherwise finished. Other painting or coating may be accomplished at this station or separately.

When a door has completed assembly and pressing, it passes to an inspection station 670 and is inspected by an inspector I who checks the door for quality. In various exemplary embodiments the quality inspection may be performed automatically as discussed above with respect to the door skin delivery station 300. Any unacceptable door is either discarded or reworked, and all doors passing inspection are sent to a star conveyor 680 and then to palletizer 690 for stacking.

A number of commonly used and commercially available adhesives have been discussed above such as PUR and EVA hot melt adhesives. However, aspects of the present invention are also directed to the novel use of adhesive compositions. In an exemplary embodiment, a PUR adhesive comprising polyurethane and isocyanurate is used in the above-disclosed system. These chemicals increase the initial green or set strength of the adhesives, securing the bond between the door skin and the frame, eliminating delamination caused by the stresses of bowed or warped skins.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. Additional embodiments are possible and are intended to be encompassed within this specification and the scope of the appended claims. The specification describes specific examples to accomplish a more general goal that may be accomplished in another way.

What is claimed is:

1. A method of making doors, comprising the steps of:
   providing a first pressing station comprising
      a first press including a first set of platens, and
      a second press including a second set of platens, each set of platens having at least one platen movable relative to the other platen between an open state and a closed state;
   providing a second pressing station comprising
      a third press including a third set of platens, and
      a fourth press including a fourth set of platens, each set of platens respectively having at least one platen movable relative to the other platen of the set of platens between an open state and a closed state;
   successively delivering assembled doors in a layup state to the first and second pressing stations;
   discharging a pressed first assembled door from the first press of the first pressing station and loading a second assembled door in the layup state into the first press of the first pressing station while the first press is in operative alignment with first loading and discharging devices, and simultaneously pressing a third assembled door in the second press of the first pressing station;

moving the second press vertically into operative alignment with the first loading and discharging devices; and discharging the pressed third assembled door from the second press and loading a fourth assembled door in the layup state into the second press while the second press is in operative alignment with the first loading and discharging devices, and simultaneously pressing the second assembled door in the first press;

discharging a pressed fifth assembled door from the third press of the second pressing station and loading a sixth assembled door in the layup state into the third press of the second pressing station while the third press is in operative alignment with second loading and discharging devices, and simultaneously pressing a seventh assembled door in the fourth press of the second pressing station;

moving the fourth press vertically into operative alignment with the second loading and discharging devices;

discharging the pressed seventh assembled door from the fourth press and loading an eighth assembled door in the layup state into the fourth press while the fourth press is in operative alignment with the second loading and discharging devices, and simultaneously pressing the sixth assembled door in the third press; and transporting the assembled doors away from the first and the second discharging devices on a single conveyor.

2. The method of claim 1, wherein the first loading and discharging devices include a first loading device configured to deliver assembled doors to the first pressing station, and a first discharging device configured to receive the assembled doors that have been pressed by the first pressing station.

3. The method of claim 2, wherein the second loading and discharging devices include a second loading device configured to deliver assembled doors to the second pressing station, and a second discharging device configured to receive the assembled doors that have been pressed by the second pressing station.

4. The method of claim 3, wherein the first pressing station is configured to alternatingly move the first and second presses between:
(i) a loading/unloading position, in which one of the first and second presses is in the open state and operative alignment with the first loading and discharging devices; and
(ii) a pressing position, in which the other of the first and second presses is in the closed state for pressing and is out of operative alignment with the first loading and discharging devices.

5. The method of claim 4, wherein the second pressing station is configured to alternatingly move the third and fourth presses between:
(i) a loading/unloading position, in which one of the third and fourth presses is in the open state and operative alignment with the second loading and discharging devices, and
(ii) a pressing position, in which the other of the third and fourth presses is in the closed state for pressing and is out of operative alignment with the second loading and discharging devices.

6. The method of claim 1, further comprising the step of holding the assembled doors that have been pressed in the first pressing station in a first accumulator downstream of the first pressing station while applied adhesive develops bond strength.

7. The method of claim 6, further comprising the step of holding the assembled doors that have been pressed in the second pressing station in a second accumulator downstream of the second pressing station while applied adhesive develops bond strength.

8. The method of claim 7, wherein the first discharging device comprises a first conveyor for transporting the assembled doors from the first pressing station to the first accumulator, and wherein the second discharging device comprises a second conveyor for transporting the assembled doors from the second pressing station to the second accumulator.

9. The method of claim 1, wherein the first discharging device comprises a first conveyor for transporting the assembled doors from the first pressing station, and wherein the second discharging device comprises a second conveyor for transporting the assembled doors from the second pressing station, and wherein the method further comprises the step of arranging the first conveyor and second conveyor parallel to the single conveyor.

10. The method of claim 7, including the step of providing a star conveyor as each of the first and second accumulators.

11. A method of making doors, comprising the steps of:
providing a first pressing station comprising
a first press including a first set of platens, and
a second press including a second set of platens, each set of platens having at least one platen movable relative to the other platen between an open state and a closed state;
providing a second pressing station comprising
a third press including a third set of platens, and
a fourth press including a fourth set of platens, each set of platens respectively having at least one platen movable relative to the other platen of the set of platens between an open state and a closed state;
successively delivering assembled doors in a layup state to the first and second pressing stations;
discharging a pressed first assembled door from the first press of the first pressing station and loading a second assembled door in the layup state into the first press of the first pressing station while the first press is in operative alignment with first loading and discharging devices, and simultaneously pressing a third assembled door in the second press of the first pressing station;
moving the second press vertically into operative alignment with the first loading and discharging devices; and
discharging the pressed third assembled door from the second press and loading a fourth assembled door in the layup state into the second press while the second press is in operative alignment with the first loading and discharging devices, and simultaneously pressing the second assembled door in the first press;
discharging a pressed fifth assembled door from the third press of the second pressing station and loading a sixth assembled door in the layup state into the third press of the second pressing station while the third press is in operative alignment with second loading and discharging devices, and simultaneously pressing a seventh assembled door in the fourth press of the second pressing station;
moving the fourth press vertically into operative alignment with the second loading and discharging devices;
discharging the pressed seventh assembled door from the fourth press and loading an eighth assembled door in the layup state into the fourth press while the fourth press is in operative alignment with the second loading and discharging devices, and simultaneously pressing the sixth assembled door in the third press;

holding the assembled doors that have been pressed in the first pressing station in a first accumulator downstream of the first pressing station while applied adhesive develops bond strength;

holding the assembled doors that have been pressed in the second pressing station in a second accumulator downstream of the second pressing station while applied adhesive develops bond strength; and transporting the assembled doors away from the first and second accumulators by a single conveyor, wherein the first discharging device comprises a first conveyor for transporting the assembled doors from the first pressing station to the first accumulator, and wherein the second discharging device comprises a second conveyor for transporting the assembled doors from the second pressing station to the second accumulator.

12. The method of claim 11, wherein the first loading and discharging devices include a first loading device configured to deliver assembled doors to the first pressing station, and a first discharging device configured to receive the assembled doors that have been pressed by the first pressing station.

13. The method of claim 12, wherein the second loading and discharging devices include a second loading device configured to deliver assembled doors to the second pressing station, and a second discharging device configured to receive the assembled doors that have been pressed by the second pressing station.

14. The method of claim 13, wherein the first pressing station is configured to alternatingly move the first and second presses between:
 (i) a loading/unloading position, in which one of the first and second presses is in the open state and operative alignment with the first loading and discharging devices; and
 (ii) a pressing position, in which the other of the first and second presses is in the closed state for pressing and is out of operative alignment with the first loading and discharging devices.

15. The method of claim 14, wherein the second pressing station is configured to alternatingly move the third and fourth presses between:
 a loading/unloading position, in which one of the third and fourth presses is in the open state and operative alignment with the second loading and discharging
 (ii) a pressing position, in which the other of the third and fourth presses is in the closed state for pressing and is out of operative alignment with the second loading and discharging devices.

16. The method of claim 11, including the step of arranging the first conveyor and second conveyor parallel to the single conveyor.

17. The method of claim 11, including the step of providing a star conveyor as each of the first and second accumulators.

* * * * *